(12) United States Patent
Yamazaki et al.

(10) Patent No.: US 8,350,964 B2
(45) Date of Patent: Jan. 8, 2013

(54) CAPTIONED IMAGE REPRODUCING DEVICE, CAPTIONED IMAGE REPRODUCING METHOD AND PROGRAM

(75) Inventors: Masahiro Yamazaki, Yokohama (JP); Tomochika Ozaki, Yokohama (JP); Masaki Wakabayashi, Kamakura (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 888 days.

(21) Appl. No.: 12/478,187

(22) Filed: Jun. 4, 2009

(65) Prior Publication Data

US 2009/0316046 A1   Dec. 24, 2009

(30) Foreign Application Priority Data

Jun. 24, 2008   (JP) ................................. 2008-164232

(51) Int. Cl.
   *H04N 7/00* (2011.01)
   *H04N 11/00* (2006.01)
   *H04N 9/80* (2006.01)
(52) U.S. Cl. ......... 348/468; 348/461; 386/241; 386/243
(58) Field of Classification Search .................. 348/468, 348/461; 386/241, 243
   See application file for complete search history.

(56) References Cited

U.S. PATENT DOCUMENTS

| | | | | |
|---|---|---|---|---|
| 5,519,443 A | * | 5/1996 | Salomon et al. | 348/467 |
| 2005/0276580 A1 | * | 12/2005 | Zacek | 386/131 |
| 2007/0040936 A1 | * | 2/2007 | Park | 348/465 |
| 2008/0292272 A1 | | 11/2008 | Yamazaki et al. | |
| 2009/0067812 A1 | * | 3/2009 | Park | 386/95 |
| 2010/0229078 A1 | * | 9/2010 | Otsubo et al. | 715/203 |

FOREIGN PATENT DOCUMENTS

| | | |
|---|---|---|
| JP | 2000-324395 | 11/2000 |
| JP | 2003-018491 | 1/2003 |
| JP | 2004-080476 | 3/2004 |
| JP | 2006-245907 | 9/2006 |
| JP | 2008-089843 | 4/2008 |
| JP | 2009-130469 | 6/2009 |
| JP | 2009-302779 | 12/2009 |

\* cited by examiner

*Primary Examiner* — Wesley Kim
(74) *Attorney, Agent, or Firm* — Cozen O'Connor

(57) ABSTRACT

A control unit creates caption management data having plural caption texts to which caption display times each indicating a time of starting reproduction of each caption text are added and plural images in association with one another in accordance with a reproduction order, and stores the caption management data in a memory unit. The control unit selects a caption text registered in the caption management data, and acquires received caption display times of the selected caption text and a caption text corresponding to the next reproduction order. The control unit sets the caption display time of the selected caption text as the initial value of a dummy caption display time. When determining that a difference between the initial value and the caption display time of the caption text corresponding to the reproduction order next to the selected caption text is larger than the reference time, the control unit stores a time acquired by adding a predetermined time to the initial value and a dummy caption in the memory unit in association with each other.

16 Claims, 20 Drawing Sheets

FIG.6A

CAPTION MANAGEMENT DATA

182a

| i | RCD TIME (TMi) | RECEIVED CAPTION (Mi) |
|---|---|---|
| 1 | 00:00:00 | GOOD MORNING. |
| 2 | 00:00:09 | GOOD AFTERNOON. |
| 3 | 00:00:13 | NICE WEATHER, TODAY. |
| 4 | 00:01:43 | GOOD BYE, TAKE CARE. |
| 5 | 00:02:11 | GOOD NIGHT. |
| ... | ... | ... |
| p | 02:10:10 | END |

FIG.6B

SEEK POINT MANAGEMENT INFORMATION

183a

| j | SEEK POINT (TRj) | IMAGE POSITION (PRj) |
|---|---|---|
| 1 | 00:00:00 | 10 |
| 2 | 00:00:07 | 22 |
| 3 | 00:00:11 | 36 |
| 4 | 00:00:17 | 50 |
| 5 | 00:00:21 | 62 |
| ... | ... | ... |
| q | 02:10:10 | 7203 |

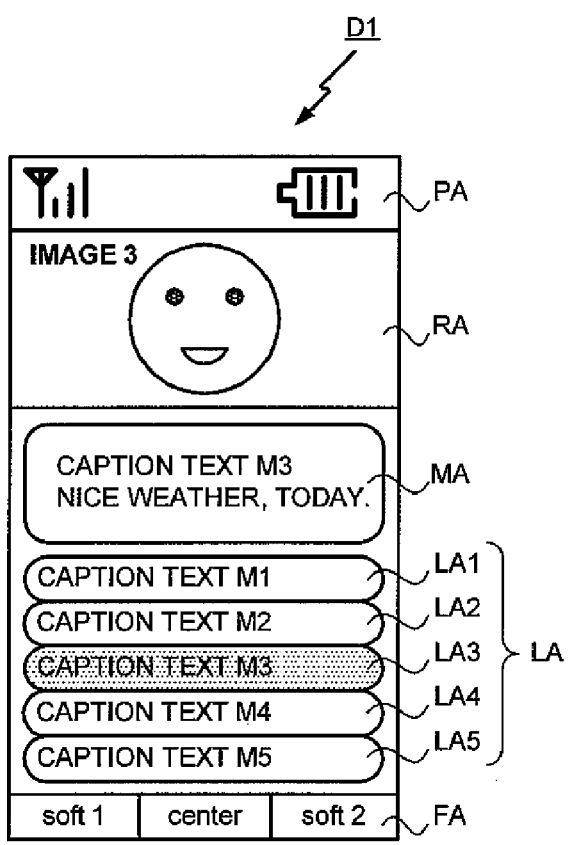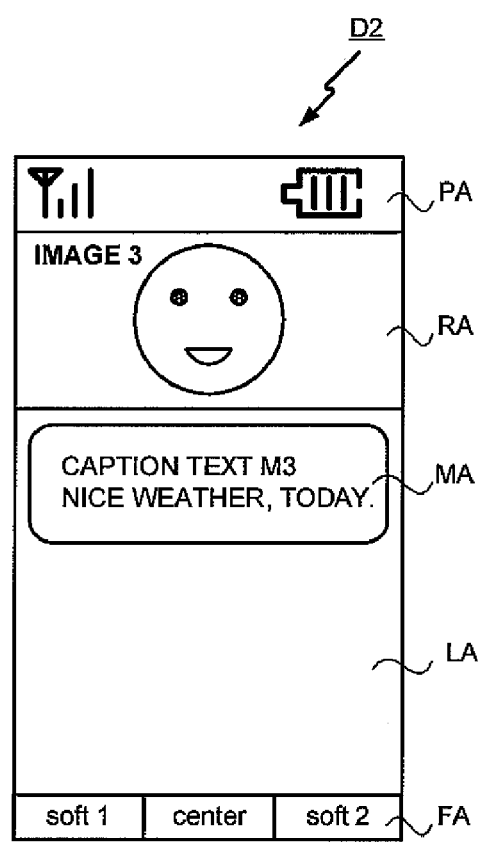

182b

| n | CAPTION DISPLAY TIME (TMn) | CAPTION TEXT (Mn) | CAPTION FLAG (FMn) |
|---|---|---|---|
| 1 | 00:00:00 | GOOD MORNING. | 0 |
| 2 | 00:00:09 | GOOD AFTERNOON. | 0 |
| 3 | 00:00:13 | NICE WEATHER, TODAY. | 0 |
| 4 | 00:00:18 | DUMMY CAPTION 00:00:18 | 1 |
| 5 | 00:00:23 | DUMMY CAPTION 00:00:23 | 1 |
| 6 | 00:00:28 | DUMMY CAPTION 00:00:28 | 1 |
| 7 | ... | ... | ... |
| 8 | 00:01:38 | DUMMY CAPTION 00:01:38 | 1 |
| 9 | 00:01:43 | GOOD BYE, TAKE CARE. | 0 |
| 10 | 00:02:11 | GOOD NIGHT. | 0 |
| ... | ... | ... | ... |
| p | 02:10:10 | END | 0 |

FIG. 16A
182a
| i | RCD TIME | RECEIVED CAPTION |
|---|---|---|
| 1 | 00:00:00 | GOOD MORNING. |
| 2 | 00:00:09 | GOOD AFTERNOON. |
| 3 | 00:00:13 | NICE WEATHER, TODAY. |
| 4 | 00:01:43 | GOOD BYE, TAKE CARE. |
| 5 | 00:02:11 | GOOD NIGHT. |
| ... | ... | ... |
| p | 02:10:10 | END |
TMi, Mi
FIG. 16B
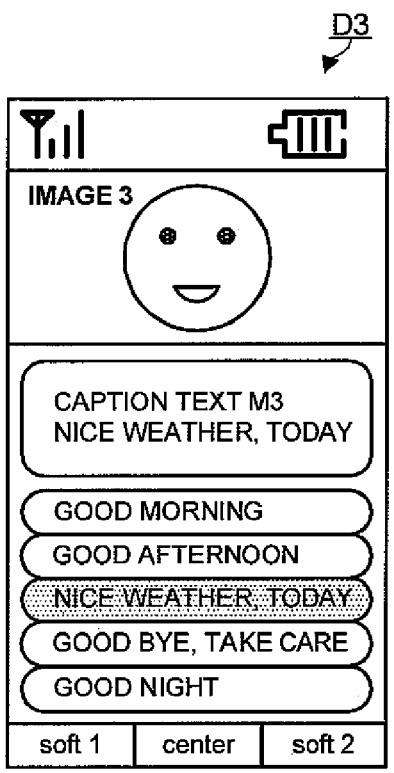
FIG. 16C
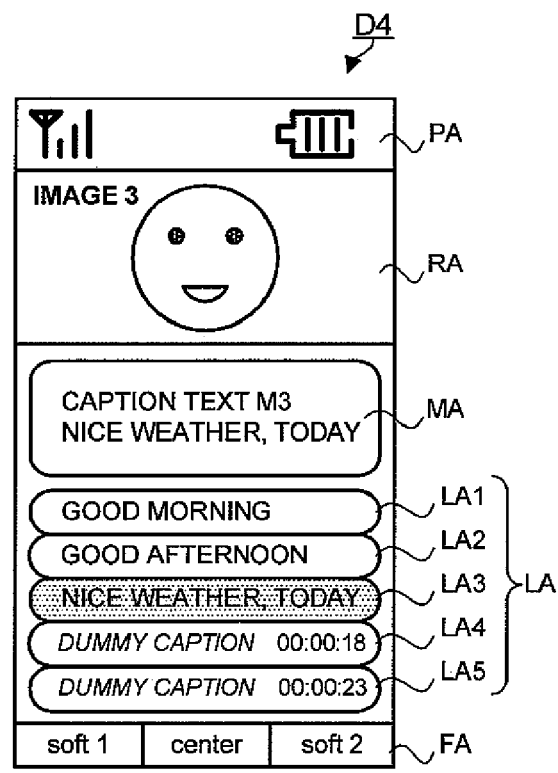

CAPTIONED IMAGE REPRODUCING DEVICE, CAPTIONED IMAGE REPRODUCING METHOD AND PROGRAM

BACKGROUND OF THE INVENTION

1. Field of the Invention

The present invention relates to a captioned image reproducing device, a captioned image reproducing method and a program which reproduces a captioned image.

2. Description of the Related Art

There is known a technology which separately outputs caption information of a captioned image and image information thereof on a display unit.

Unexamined Japanese Patent Application KOKAI Publication No. 2003-18491 discloses a caption display device which extracts a caption text, to which a display time is added, from a stream, and when a user selects a caption text, synthesizes the selected caption text with an image corresponding to the selected caption text, and displays the synthesized image.

SUMMARY OF THE INVENTION

In a show, even if performers have a conversation, a caption text may not be added to the image of that scene, and there may be a scene in which a ticker is displayed in an image. Examples of such a scene in which a ticker is displayed in an image are a scene that a performer comments an interesting thing, or a scene that an important comment is read through a narration.

When a content includes a scene to which no caption text is added, if such a content is reproduced by the caption display device disclosed in the foregoing patent literature, there is a problem that a user cannot view the intended scene by selecting a corresponding caption text. Note that a caption contained in content data transmitted from an external device like a tower is called "received caption".

The present invention has been made in view of the foregoing circumstance, and it is an object of the present invention to provide a captioned image reproducing device, a captioned image reproducing method and a program which allow a user to view a scene to which no received caption is added through an operation of selecting a caption text.

To achieve the object, a captioned image reproducing device according to the first aspect of the present invention comprises: a memory unit that stores plural caption texts, plural images, and plural pieces of reproduction start information each indicating a timing of starting reproduction of each caption text in the plural caption texts; a caption list creating unit that refers to the memory unit and creates a caption list including therein a predetermined number of caption texts in accordance with a reproduction order; a caption text selecting unit that selects any one of the caption texts included in the caption list; a reproducing unit that reproduces a first caption text selected by the caption text selecting unit and at least one of the plural images corresponding to the reproduction start information of the first caption text; a determination unit that refers to the memory unit, acquires the reproduction start information of the first caption text and the reproduction start information of a second caption text different from the first caption text, and compares a difference between the reproduction start information of the first caption text and the reproduction start information of the second caption text with predetermined reference information; a setting unit that sets new reproduction start information between a reproduction order of the first caption text and a reproduction order of the second caption text based on a determination result by the determination unit; and a control unit that controls the memory unit to store the new reproduction start information in association with a predetermined dummy caption, at least one of the plural images, and dummy caption reproduction start information indicating a timing of starting reproduction of the dummy caption.

The second caption text may be a caption text corresponding to a reproduction order right before or right after the first caption text; and when the determination unit determines that the difference between the two pieces of reproduction start information is larger than the reference information, the setting unit may set the new reproduction start information between the reproduction order of the first caption text and the reproduction order of the second caption text.

The dummy caption reproduction start information may be information acquired by subtracting a predetermined value from the reproduction start information of the first caption text when the second caption text is a caption text corresponding to the reproduction order right before the first caption text, and may be information acquired by adding a predetermined value to the reproduction start information of the first caption text when the second caption text is a caption text corresponding to the reproduction order right after the first caption text.

The dummy caption may contain the dummy caption reproduction start information.

The caption text may contain a received caption contained in broadcasting data transmitted from an external device and the dummy caption; the captioned image reproducing device may further comprise a caption list display unit that displays the caption list; and the caption list creating unit may create a caption list containing the received caption and the dummy caption associated with the new reproduction start information by the control unit.

The caption text may contain a received caption contained in broadcasting data transmitted from an external device and the dummy caption; the captioned image reproducing device may further comprise a caption list display unit that displays the caption list and a switching unit that switches a mode between a first mode that the caption list includes therein only the received caption and a second mode that the caption list includes therein the received caption and the dummy caption; the control unit may add an identifier indicating that a caption text is the received caption or the dummy caption to a caption text stored in the memory unit; and when the switching unit switches the mode, the caption list creating unit may determine the identifier added to the caption text, and may create a caption list based on a determination result.

When the switching unit switches the mode to the first mode, the caption list creating unit may determine a caption text to which an identifier that the caption text is the received caption is added, and may create a caption list that includes therein a predetermined number of caption texts in accordance with the reproduction order.

When the switching unit switches the mode to the second mode, the caption list creating unit may determine a caption text to which an identifier that the caption text is the received caption or the dummy caption is added, and may create a caption list which includes therein a predetermined number of caption texts in accordance with the reproduction order.

The caption text selecting unit may successively determine the identifiers in an ascending order or a descending order in accordance with the reproduction order, and may select a caption text to which the identifier is added when determining that the identifier indicates that the caption text is the received caption.

The captioned image reproducing device may further comprise: an image creating unit that creates a picture image indicating the length of a total reproduction time of a content stored in the memory unit; an image synthesizing unit that synthesizes a predetermined first image with the picture image at a position corresponding to the reproduction start information of a caption text to which an identifier indicating that the caption text is the received caption is added, and synthesizes a predetermined second image with the picture image at a position corresponding to the reproduction start information of the caption text to which an identifier indicating that the caption text is the dummy caption is added; and a display unit that displays a synthesized image synthesized by the image synthesizing unit.

The picture image may be a bar or a line.

The first image may have a predetermined color; and the second image may have a color different from the predetermined color.

The first image may be a line having a predetermined thickness; and the second image may be a line having a thickness different from the predetermined thickness.

The first image may be a circle having a predetermined diameter; and the second image may be a circle having a diameter different from the predetermined diameter.

A captioned image reproducing method according to the second aspect of the present invention comprises: a memory step of storing plural caption texts, plural images and plural pieces of reproduction start information each indicating a timing of starting reproduction of each caption text in the plural caption texts in a memory unit; a caption list creating step of referring to the memory unit and of creating a caption list including therein a predetermined number of caption texts in accordance with a reproduction order; a caption text selecting step of selecting any one of the caption texts included in the caption list; a reproduction step of reproducing a first caption text selected through the caption text selecting step and at least one of the plural images corresponding to the reproduction start information of the first caption text; a determination step of referring to the memory unit, of acquiring the reproduction start information of the first caption text and the reproduction start information of a second caption text different from the first caption text, and of comparing a difference between the reproduction start information of the first caption text and the reproduction start information of the second caption text with predetermined reference information; a setting step of setting new reproduction start information between a reproduction order of the first caption text and a reproduction order of the second caption text based on a determination result of the determination step; and a control step of controlling the memory unit to store the new reproduction start information in association with a predetermined dummy caption, at least one of the plural images, and dummy caption reproduction start information indicating a timing of starting reproduction of the dummy caption.

A program according to the third aspect of the present invention allows a computer to function as: a memory unit that stores plural caption texts, plural images, and plural pieces of reproduction start information each indicating a timing of starting reproduction of each caption text in the plural caption texts; a caption list creating unit that refers to the memory unit and creates a caption list including therein a predetermined number of caption texts in accordance with a reproduction order; a caption text selecting unit that selects any one of the caption texts included in the caption list; a reproducing unit that reproduces a first caption text selected by the caption text selecting unit and at least one of the plural images corresponding to the reproduction start information of the first caption text; a determination unit that refers to the memory unit, acquires the reproduction start information of the first caption text and the reproduction start information of a second caption text different from the first caption text, and compares a difference between the reproduction start information of the first caption text and the reproduction start information of the second caption text with predetermined reference information; a setting unit that sets new reproduction start information between a reproduction order of the first caption text and a reproduction order of the second caption text based on a determination result by the determination unit; and a control unit that controls the memory unit to store the new reproduction start information in association with a predetermined dummy caption, at least one of the plural images, and dummy caption reproduction start information indicating a timing of starting reproduction of the dummy caption.

According to the present invention, it is possible to provide a captioned image reproducing device, a captioned image reproducing method, and a program which allow a user to view a scene to which no received caption is added through an operation of selecting a caption text by associating an image to which a received caption is not added with a dummy caption.

BRIEF DESCRIPTION OF THE DRAWINGS

The object and other objects and advantages of the present invention will become more apparent upon reading of the following detailed description and the accompanying drawings in which:

FIG. 6A is a diagram showing an example of the data structure of caption management data;

FIG. 6B is a diagram showing an example of the data structure of seek point management information;

FIG. 7A is a diagram showing an example of a screen in a caption-list-added viewing mode;

FIG. 7B is a diagram showing an example of a screen in a normal viewing mode;

FIG. 16A is a diagram showing an example of the content of caption management data stored in the memory unit;

FIG. 16B is a diagram showing an example of a screen displayed by a display unit on an LCD in a normal caption display mode;

FIG. 16C is a diagram showing an example of a screen displayed by the display unit on the LCD in a dummy caption display mode;

DETAILED DESCRIPTION OF THE PREFERRED EMBODIMENT

An explanation will be given of a captioned image reproducing device according to the embodiment of the present invention with reference to accompanying drawings. Note that in the embodiment, an explanation will be given of a case where the captioned image reproducing device is a cellular phone.

Figure 1:
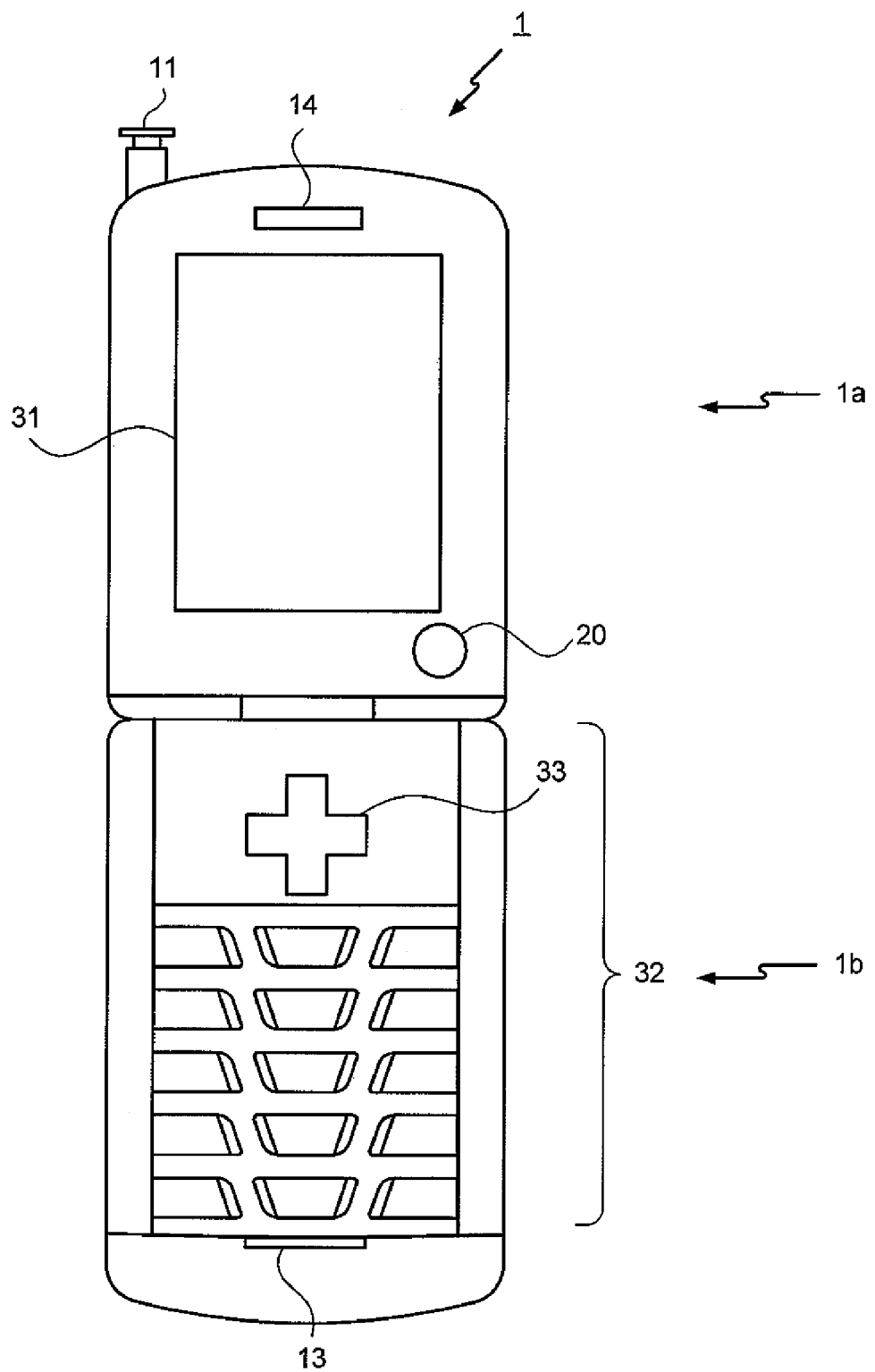
FIG. 1 is a diagram showing the external appearance of a cellular phone according to an embodiment of the present invention.

FIG. 1 shows the external appearance of the cellular phone according to the embodiment.

A cellular phone 1 is, for example, a foldable type that is separated into an upper casing 1a and a bottom casing 1b.

Figure 2:
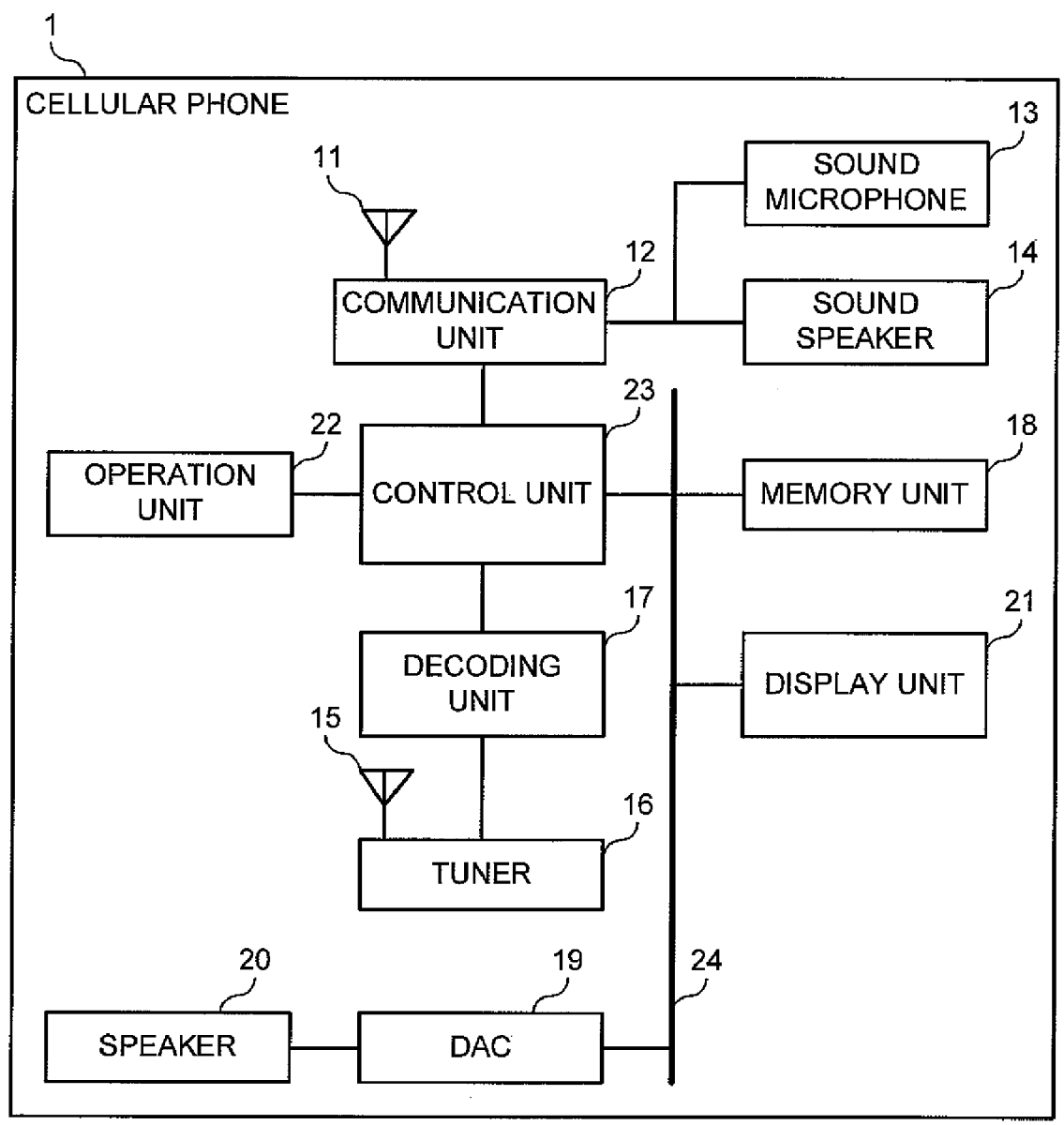
FIG. 2 is a block diagram showing the structure of the cellular phone according to the embodiment of the present invention.

FIG. 2 shows the structure of the cellular phone 1 according to the embodiment.

The cellular phone 1 of the embodiment has an antenna 11, a communication unit 12, a sound microphone 13, a sound speaker 14, an antenna 15, a tuner 16, a decoding unit 17, a memory unit 18, a DAC (Digital to Analog Converter) 19, a speaker 20, a display unit 21, an operation unit 22, a control unit 23, and a bus 24.

The cellular phone 1 displays a caption text and an image, can display a caption list, and can select an image based on a caption text selected from the caption list.

The bus 24 allows individual units to mutually transmit/receive data. The control unit 23, the memory unit 18, the DAC 19, and the display unit 21 are connected together via the bus 24.

The antenna 11 transmits/receives a radio wave signal, such as a telecommunication sound or various data, with a base station (not shown). As shown in FIG. 1, the antenna 11 is provided at the upper part of the upper casing 1a of the cellular phone 1. Note that the antenna 11 may not be provided at the upper casing 1a, but may be provided at the bottom casing 1b.

The communication unit 12 processes a radio wave signal transmitted/received by the antenna 11.

The sound microphone 13 is provided at the bottom casing 1b as shown in FIG. 1. The sound microphone 13 collects a sound and converts the sound into a sound signal, and supplies the converted sound signal to the communication unit 12 when a user is calling.

The sound speaker 14 is provided at the upper casing 1a as shown in FIG. 1, and outputs a sound based on a sound signal when the user is calling for example.

The antenna 15 receives a radio wave signal of a broadcast signal of a one-segment broadcasting, and is embedded in the cellular phone 1. The broadcast signal of the one-segment broadcasting contains image data, sound data and caption data as content data of the broadcasting program. Note that the radio wave signal received by the antenna 15 is in, for example, a format in accordance with a data transfer scheme in the one-segment broadcasting.

The tuner 16 and the decoding unit 17 analyze the broadcast signal received by the antenna 15, and acquire image data, sound data, and caption data. The tuner 16 demodulates a one-segment broadcasting signal from the radio wave signal received by the antenna 15, and supplies the demodulated signal to the decoding unit 17.

Figure 3:
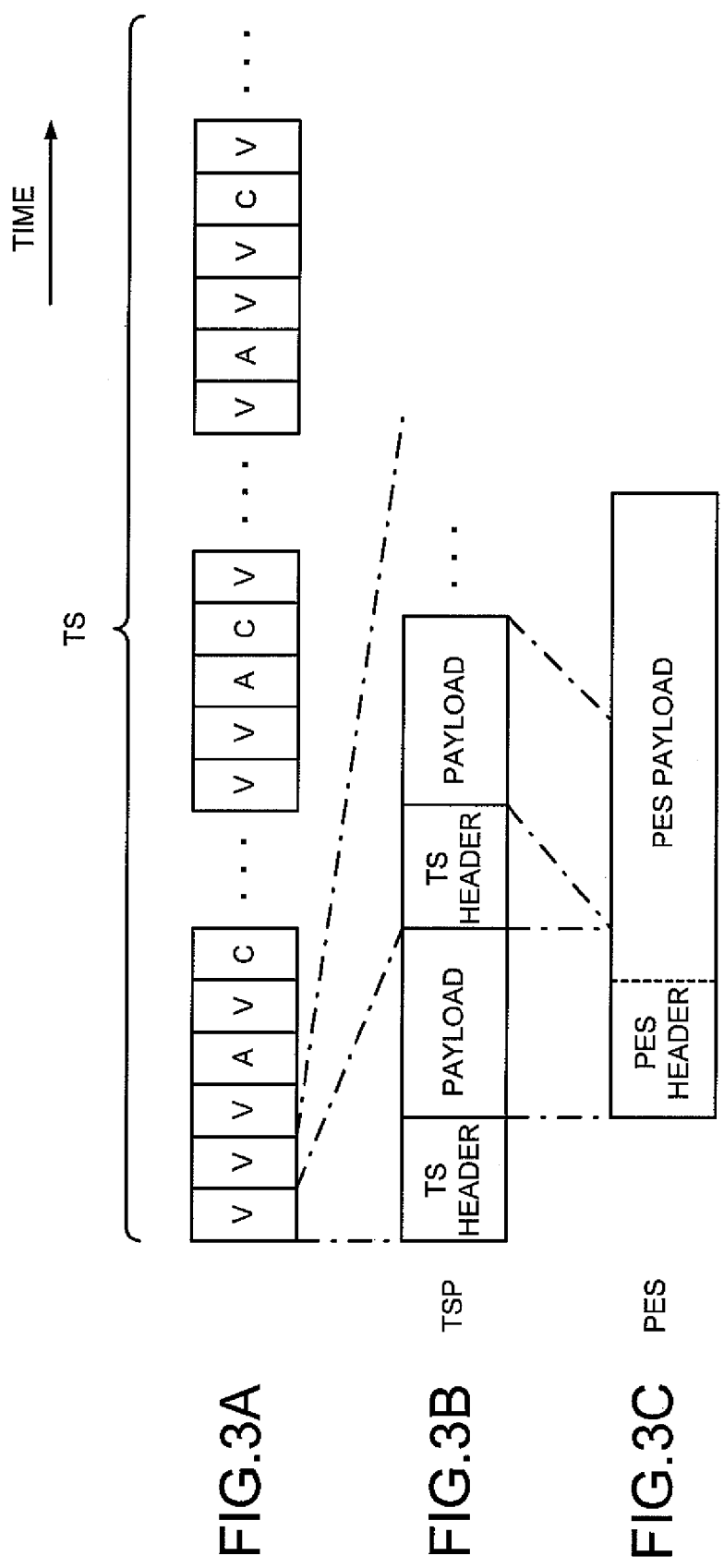
FIG. 3A is a diagram showing the structure of TS which is a signal to be received.
FIG. 3B is a diagram showing the structure of TSP.
FIG. 3C is a diagram showing the structure of PES.

The decoding unit 17 performs decoding on the supplied demodulated signal to create TS (Transport Stream) shown in FIG. 3A.

TS is a stream that TSP (Transport Stream Packet) is multiplexed, and examples of TSP are an image packet V for image data, a sound packet A for sound data, and caption packet C for a caption.

As shown in FIG. 3B, each TSP comprises a TS header and a payload. The TS header is an area storing data indicating the beginning of the TSP and a packet identifier.

The payload is an area storing data, and PES (Packetized Elementary Stream) packets as shown in FIG. 3C are dividedly stored therein. PES comprises data stored in each payload.

PES comprises a PES header and a PES payload. The PES header is an area storing data indicating the beginning of PES, a packet identifier, a packet length, and the like. The PES payload is an area in which ES (Elementary Stream) is dividedly stored. Image data, sound data and caption data are compressed and coded, and stored in the PES payload.

The decoding unit 17 separates the image packet V, the sound packet A, and the caption packet C from TS based on information stored in the TS header, and acquires PES from the payload of each TSP.

Furthermore, the decoding unit 17 creates a video PES containing image data, a sound PES containing sound data, and a caption PES containing caption data as shown in FIG. 3C, based on data stored in the PES header.

Note that the TSP has a fixed length but PES has a flexible length. Accordingly, TSP may contain an adaptation field for setting the length of TSP to be a constant length.

Figure 4:
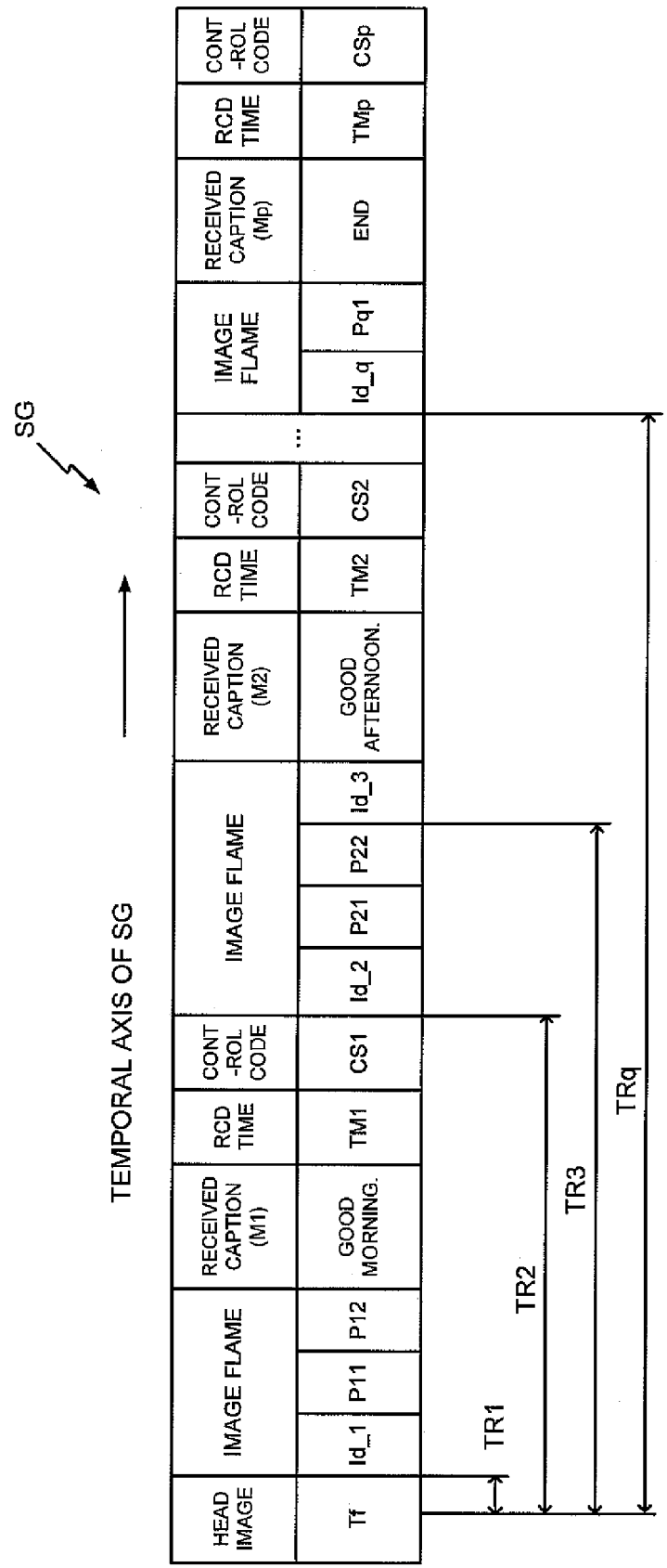
FIG. 4 is a diagram showing the structure of a converted television signal.

FIG. 4 shows an example of a television signal (hereinafter, "TV signal") SG of an image to be displayed and a received caption. The cellular phone 1 converts content recording data into the format of the TV signal SG, and further converts the converted data into image data which can be displayed, and reproduces an image.

Data in the one-segment broadcasting is data in accordance with a predictive coding scheme, and a video PES contains an IDR (Instantaneous Decoder Refresh) flame and a P flame.

In FIG. 4, Id_1, Id_2, Id_3, and Id_q indicate IDR flames, P11, P12, P21, P22, and Pq1 indicate P flames. Note that q is the number of IDR flames contained in the TV signal SG.

The IDR flames Id_1 to Id_q are flames which do not refer to another image flame, and correspond to an independent image packet VI. The P flames P11 to Pq1 are flames which refer to the IDR flames Id_1 to Id_q that are to be reproduced prior to the reproduction times of the P flames, and correspond to a reference image packet VP.

The PES header of the video PES contains a reproduction time Tf. The reproduction time Tf is data indicating a reproduction time of an image at the head of the TV signal SG that is to be constructed. The TS header contains seek points TR indicating display times of the IDR flames Id_1 to Id_q.

In FIG. 4, TR1, TR2, TR3, TRq indicate the respective elapsed times of the IDR flames Id_1, Id_2, Id_3, Id_q from the reproduction time Tf.

The payload of the caption PES contains compressed and coded received captions (data) M1 to Mp (where p is a positive integer). The received caption M1 to Mp is data indicating the content of a caption added to an image.

Each PES header of the caption PES contains received caption display times (RCD times) TM1 to TMp and control codes CS1 to CSp.

The received caption display time TM1 to TMp is time information indicating a timing of displaying the received caption M1 to Mp. The control codes CS1 to CSp are information indicating a break of the received caption M1 to Mp.

The TS header shown in FIG. 3B contains reference time information called PCR (Program Clock Reference). The PES header contains a PTS (Presentation Time Stamp). The PTS is time information indicating a time of reproducing an ES Elementary Stream) in the PES, and is represented based on a clock frequency of 90 kHz.

The cellular phone 1 determines that an instantaneous time when the PCR is received is a time represented by a PCR value, and causes the STC (System Time Clock) of the cellular phone 1 to be synchronized with the PCR. Accordingly, the time of all receivers (cellular phones 1) are synchronized.

Note that the reproduction time Tf, received caption display times TM1 to TMp, and the seek points TR1 to TRq are stored as data in PTS scale.

The decoding unit 17 supplies information of the PES header to the control unit 23 along with the decoded video PES, sound PES, and caption PES.

Returning to FIG. 1, the memory unit 18 stores various data. The memory unit 18 comprises a non-volatile memory like a flash memory, an internal memory like a RAM (Random Access Memory), an external recording medium, or the like.

Figure 5:
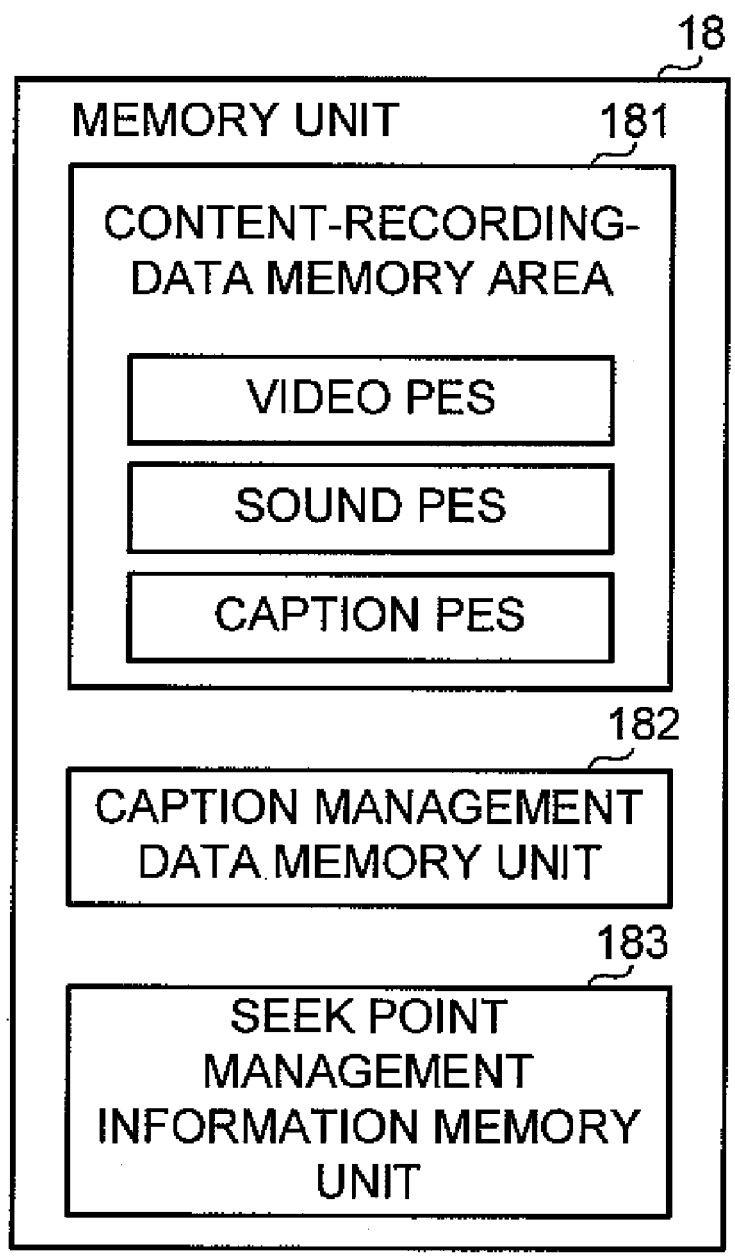
FIG. 5 is a diagram showing each memory area of a memory unit shown in FIG. 2.

As shown in FIG. 5, the memory unit 18 has a content-recording-data memory area 181, a caption management data memory area 182, and a seek point management information memory area 183.

The content-recording-data memory area 181 stores the video PES, the sound PES, and the caption PES, all analyzed by the decoding unit 17 as data. When an image, a sound and a caption are reproduced, the video PES and the sound PES are provided to the decoding unit 17, and the decoding unit 17 creates an image and a sound based on each PES.

The caption management data memory area 182 stores caption management data 182a shown in FIG. 6A. The caption management data is table data associating a "received caption display time TMi (i=1 to p)" with a "received caption Mi", and is created by the control unit 23. When a caption text is reproduced, the caption management data is supplied to the decoding unit 17, and the decoding unit 17 creates a caption text based on the caption management data. At the time indicated by a received caption display time while reproducing a captioned image, a corresponding caption text is displayed on the display unit 21.

The "received caption display time TMi" indicates a time when a received caption Mi is displayed. In the embodiment, the received caption display time TMi, i.e., a reference of displaying the received caption Mi is an offset time which is a reproduction time Tf at a reproduction start time of content recording data (i.e., reproduction time of an image at the head of a TV signal).

The seek point management information memory area 183 stores seek point management information 183a shown in FIG. 6B. The seek point management information 183a is table data associating a seek point TRj (j=1 to q) with an image position PRj, and is created by the control unit 23.

The "seek point TRj" indicates a time when individual image flame is displayed, and is represented in a PTS scale. The "image position PRj" is data indicating a position of an image flame in content recording data, and functions as an index. In the case of a one-segment broadcasting, the "image position PRJ" is generally the number of TSP including the head of an IDR flame.

Furthermore, the memory unit 18 stores data of an operation control program for the control unit 23, and functions as a work memory for the control unit 23.

Returning to FIG. 2, the DAC 19 converts a digital audio signal (sound data) from the control unit 23 to an analog audio signal, and supplies the converted analog audio signal to the speaker 20.

The speaker 20 outputs a sound based on the analog audio signal supplied from the DAC 19. The speaker 20 is provided at the upper casing 1a.

The display unit 21 comprises a dot-matrix type LCD (Liquid Crystal Display) 31, a driver circuit (not shown), and the like. The LCD 31 is provided at the upper casing 1a. The display unit 21 reads out data from the memory unit 18 under the control of the control unit 23, and displays an image and a caption to be reproduced together on the LCD 31 based on the read-out data. Note that in the embodiment, the display used in the display unit 21 is an LCD, but the present invention is not limited to this case. For example, an organic EL (Electro-Luminescence) display may be used.

The cellular phone 1 has two viewing modes which are a "caption-list-added viewing mode" and a "normal viewing mode". The display unit 21 displays a screen on the LCD 31 in accordance with the mode.

The "caption-list-added viewing mode" is a mode in which a caption corresponding to an image is displayed together with a caption list, and enables the user to select a desired image as the user selects a caption from the caption list using a keyboard 32.

The "normal viewing mode" is a mode of successively reproducing a caption selected in the caption-list-added viewing mode and an image corresponding to the caption, without displaying the caption list.

When the "caption-list-added viewing mode" is selected, the display unit 21 displays a screen D1 shown in FIG. 7A on the LCD 31.

In the screen of the "caption-list-added viewing mode", an image is displayed in an image area RA. The display unit 21 displays images corresponding to reproduction orders of caption texts selected from the caption list in the image area RA.

A caption is displayed in a caption area MA. The display unit 21 displays a caption selected by the user from the caption list in the caption area MA.

Plural caption texts arranged like a list are displayed in a caption list area LA. The display unit 21 displays, for example, five caption list branch areas LAm (m: 1 to 5) in the caption list area LA.

A soft key area FA displays soft keys Soft1 and Soft2. The soft keys Soft1 and Soft2 are used for, for example, switching viewing modes. The soft keys Soft1 and Soft2 can be selected using the keyboard 32.

A pictograph area PA displays operational information on the cellular phone 1. The display unit 21 displays a radio wave receiving condition of the cellular phone 1, the remaining amount of a battery, current date and time, and the like in the pictograph area PA.

The "normal viewing mode" is a mode of displaying a reproduced caption together with an image without displaying the caption list. When the "normal viewing mode" is selected, the display unit 21 displays a screen D2 shown in FIG. 7B having an empty caption list LA on the LCD 31.

In the caption-list-added viewing mode, as the user operates the operation unit 22 to select a desired caption, the mode is shifted to the normal viewing mode. Then, captions are successively reproduced in accordance with the reproduction order from the selected caption in the caption area MA, and images are successively reproduced in accordance with the reproduction order from an image corresponding to the selected caption in the image area RA.

As the reproduction of the image and the caption is stopped, the mode is shifted back to the caption-list-added viewing mode, and the caption list is displayed on the caption list area LA. Thereafter, as the user selects a caption, a desired image can be selected again.

The operation unit 22 receives inputting by the user, such as an instruction of staring/stopping reception of a one-segment broadcasting, an instruction of starting/stopping recording of a content when the user records a television program, and inputting of a password in user authentication.

The operation unit 22 has the keyboard 32 shown in FIG. 1. The keyboard 32 has a power switch, a cursor key 33, and numeric keys, and is used for turning ON or OFF the cellular phone 1, switching the modes, inputting of a number, a character, a symbol, making selection from a menu, and reception of a one-segment broadcasting.

The control unit 23 comprises a CPU (Central Processing Unit) and the like, and controls the cellular phone 1 overall in accordance with the operation control program data stored in the memory unit 18. Moreover, the control unit 23 controls the operation of the cellular phone 1 based on operation information supplied from the operation unit 22.

Next, an explanation will be given of the operation of the cellular phone 1 according to the embodiment.

First, an explanation will be given of an operation of receiving the radio wave signal of a one-segment broadcasting and recording the one-segment broadcasting.

The control unit 23 turns ON or OFF the cellular phone 1 every time operation information to the effect that the power switch of the keyboard 32 is pressed is supplied from the operation unit 22.

As operation information for making selection from a menu of receiving a broadcast signal of a one-segment broadcasting is supplied from the operation unit 22, the control unit 23 controls the antenna 15, the tuner 16 and the decoding unit 17 to start receiving the signal of the one-segment broadcasting.

The antenna 15 receives a radio wave signal of the one-segment broadcasting. The tuner 16 demodulates the signal of the one-segment broadcasting from the radio wave signal received by the antenna 15, and supplies the demodulated signal to the decoding unit 17.

The decoding unit 17 separates image data, sound data, and caption data contained in the supplied content data. The decoding unit 17 decodes those data, and supplies a video PES, a sound PES, and a caption PES, acquired by decoding, to the control unit 23.

As operation information to the effect that a menu of recording the content of the one-segment broadcasting is selected is supplied from the operation unit 22, the control unit 23 records the one-segment broadcasting.

The control unit 23 stores the video PES, the sound PES, and the caption PES supplied from the decoding unit 17 in the content-recording-data memory area 181 of the memory unit 18.

Figure 8:
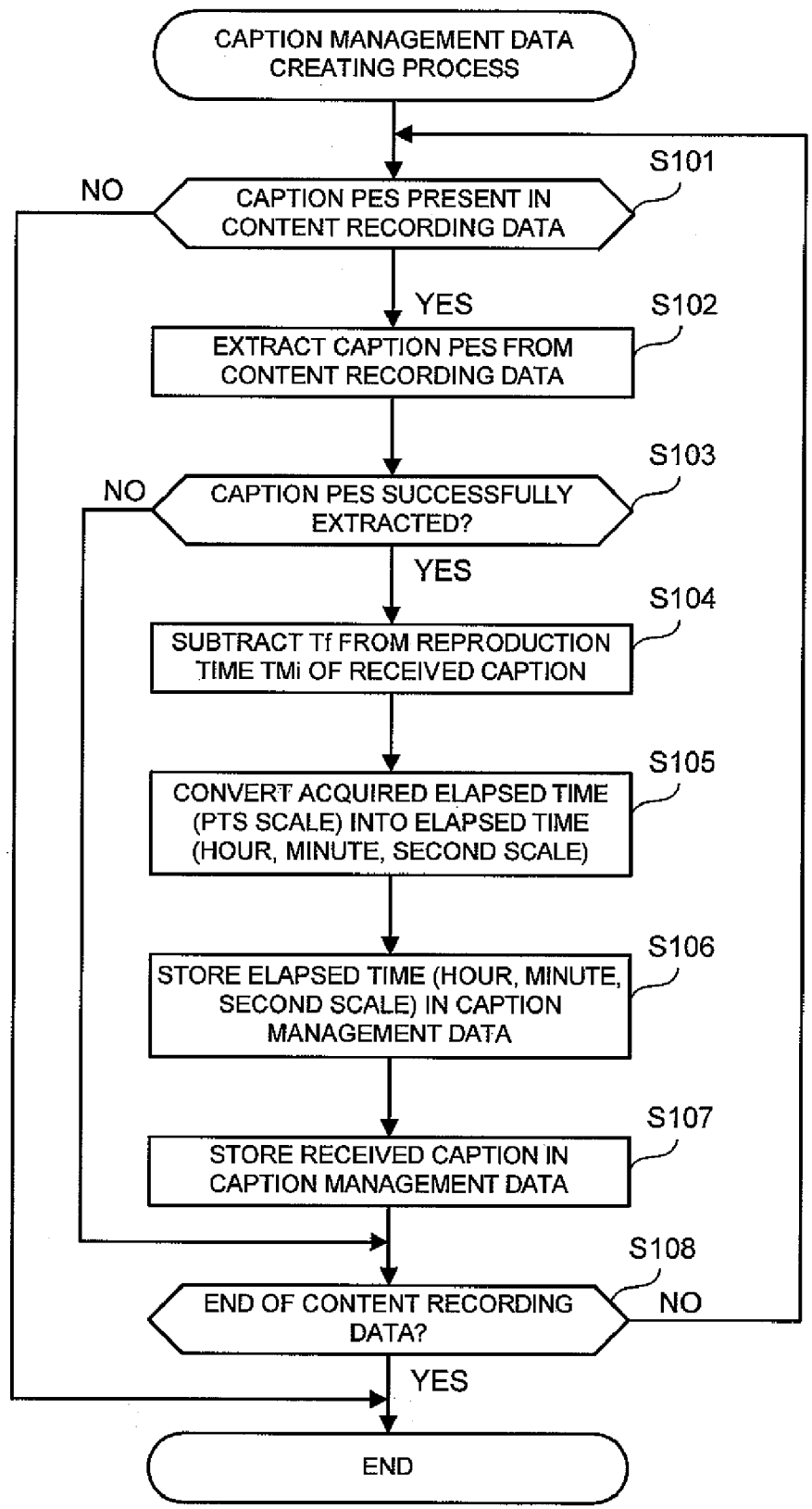
FIGS. 8 and 9 are a flowchart showing a caption management data creating process executed by a control unit of the cellular phone according to the embodiment.

As the control unit 23 stores the video PES, the sound PES, and the caption PES in the content-recording-data memory area 181, the control unit 23 then reads out program data for a caption management data creating process, and executes the caption management data creating process in accordance with the flowchart of FIG. 8.

First, the control unit 23 determines whether or not there is a caption PES in the content recording data (step S101). When determining that there is no caption PES (step S101: NO), the control unit 23 terminates the caption management data creating process.

When determining that there is a caption PES (step S101: YES), the control unit 23 extracts a caption PES (step S102).

Next, the control unit 23 determines whether or not extraction of a caption PES in the step S102 has succeeded (step S103). When determining that extraction of the caption PES has failed (step S103: NO), the control unit 23 progresses the process to step S108.

When determining that extraction of the caption PES has succeeded (step S103: YES), the control unit 23 acquires a reproduction timing TMi of a caption text, subtracts a reproduction time Tf of image data at the head of a TV signal from the reproduction timing TMi, and acquires an elapsed time (TMi−Tf) (step S104).

The control unit 23 converts the acquired elapsed time in a PTS scale into an elapsed time in a time scale (hour, minute, second) (step S105).

The control unit 23 registers the elapsed time (hour, minute, second scale) converted in the step S105 in the caption management data 182a (step S106). The elapsed time converted in the step S105 represents a time from when a content is reproduced and to when a received caption is reproduced. This elapsed time will be hereinafter called "received caption display time".

Next, the control unit 23 extracts a received caption Mi from the caption PES, and registers the received caption Mi in the caption management data 182a in association with the received caption display time (hour, minute, second scale) registered in the step S106 (step S107).

Thereafter, the control unit 23 determines whether or not it is the last portion of the content recording data (step S108). When determining that it is the last portion of the content recording data (step S108: YES), the control unit 23 terminates the caption management data creating process.

When determining that it is not yet the last portion of the content recording data (step S108: NO), the control unit 23 returns the process to the step S101. Accordingly, the control unit 23 repeats the process from the step S101 to the step S108 until the process is performed on the last portion of the content recording data.

As the caption management data creating process is executed in this fashion, the control unit 23 successively analyzes TSP based on data of a TS header supplied from the decoding unit 17. The control unit 23 registers data on the result of the analysis in the seek point management information memory area 183 of the memory unit 18 to create seek point management information 183a.

Meanwhile, in the foregoing caption management data creating process, when a difference in time between two received caption display times corresponding to received captions having successive reproduction orders is larger than a predetermined time, it is not possible to select an image corresponding to a time between the two received caption display times. For example, in a scene where a performer is saying interesting words, such interesting words are not displayed as a caption, but displayed as a ticker in an image.

In this case, in the caption-list-added viewing mode, since there is no received caption corresponding to such a scene, it is not possible to select a desired image of that scene by selecting a received caption.

Accordingly, when a difference in time between received caption display times corresponding to received captions having successive reproduction orders is greater than a predetermined time, caption management data that a dummy caption is inserted between the successive reproduction orders is created.

An explanation will be given of the caption management data creating process of creating caption management data that a dummy caption is inserted with reference to FIG. 9. Note that a reference time δT1 and a predetermined time δT2 to be discussed later are arbitrary times set beforehand.

Figure 9:
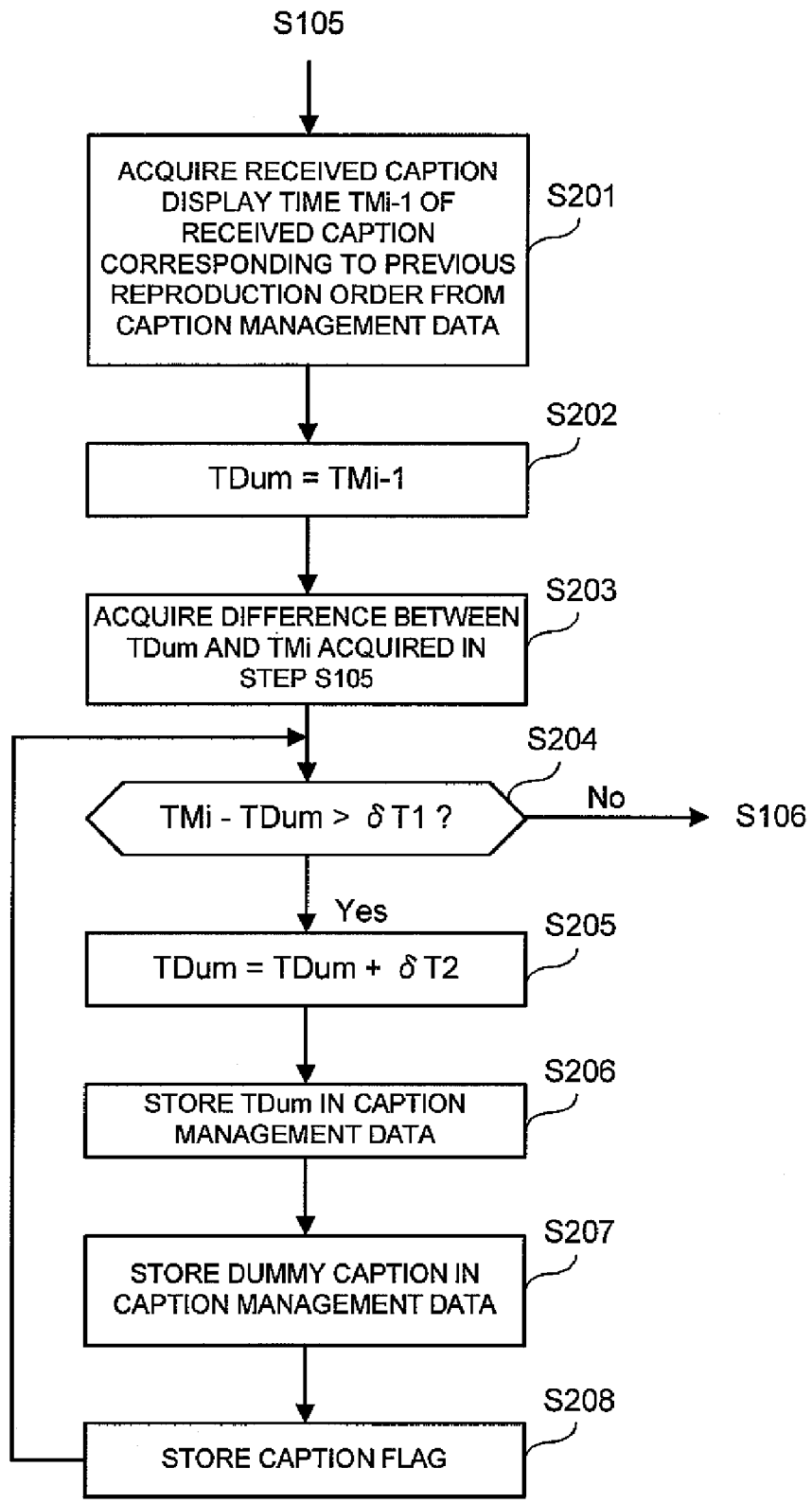

As the control unit 23 stores the video PES, the sound PES, and the caption PES in the content-recording-data memory area 181, the control unit 23 reads out the program data for the caption management data creating process, and, in accordance with the flowchart of FIG. 9, executes the caption management data creating process.

First, the control unit 23 executes the process from the step S101 to the step S105 shown in the flowchart of FIG. 8.

When converting the elapsed time of a received caption extracted from a caption PES into an hour, minute, and second scale (step S105), the control unit 23 acquires a received caption display time TMi−1 of a received caption Mi−1 corresponding to a previous reproduction order of the extracted received caption from caption management data (step S201). Let us suppose that caption management data created using this caption management data creating process is the caption management data 182b.

Next, the control unit 23 sets the received caption display time TMi−1 acquired in the step S201 to be the initial value of a dummy caption MDum display time (hereinafter referred to as "dummy caption display time") TDum (step S202).

The control unit 23 acquires a difference between the initial value of the set TDum and the received caption display time TMi(TMi−TDum) (step S203). Subsequently, the control unit 23 determines whether or not (TMi−TDum) acquired in the step S203 is larger than the reference time δT1 (step S204).

When determining that (TMi−TDum) is smaller than or equal to the reference time δT1 (step S204: NO), the control unit 23 progresses the process to the step S106 in the flowchart of FIG. 8.

When determining that (TMi−TDum) is larger than the reference time δT1 (step S205: YES), the control unit 23 sets a new reproduction order between the received caption Mi−1 and the received caption Mi. Thereafter, the control unit 23 sets a dummy caption display time of a dummy caption corresponding to the set reproduction order to be (TDum+δT2) (step S205).

The control unit 23 stores the set dummy caption display time TDum in the caption management data 182b (step S206), and stores the dummy caption corresponding to the stored dummy caption display time TDum in the caption management data 182b (step S207).

Next, the control unit 23 stores a caption flag FMi in the caption management data 182b (step S208). When the caption flag is, for example, "0", it indicates that a caption text is a "received caption", and when the caption flag is "1", it indicates that a caption text is a "dummy caption".

As the caption flag FMi is stored in the caption management data 182b, the control unit 23 returns the process to the step S204. Thereafter, the control unit 23 repeats the process from the step S204 to the step S208 until a difference between the received caption display time TMi and a dummy caption display time stored in the caption management data 182b right before becomes smaller than or equal to the reference time δT1.

Figure 10:
FIG. 10 is a diagram showing an example of the data structure of caption management data.

Regarding the data structure of the caption management data 182b created by the control unit 23, the caption management data memory area 182 stores, as shown in FIG. 10, a caption display time TMn, a caption text Mn, and a caption flag FMn in association with one another. Here, the "caption display time TMn" contains a received caption display time and a dummy caption display time, and the "caption text Mn" contains a received caption and a dummy caption.

By referring to the caption management data 182b created through the caption management data creating process, the control unit 23 performs control so that a dummy caption corresponding to the image of a scene having no received caption is displayed in the caption list area LA in the caption-list-added viewing mode. As the user selects the dummy caption displayed in the caption list area LA, a desired image of a scene having no received caption can be selected and reproduced. This improves the convenience.

Next, an explanation will be given of an operation of scrolling and displaying a selected caption text in such a way that the caption text is located at the center of the caption list area LA, with reference to the flowchart of FIG. 11. Note that in the embodiment, as shown in FIG. 7A, an explanation will be given of a case where a caption list displayed in the caption list area LA has five caption texts.

Figure 11:
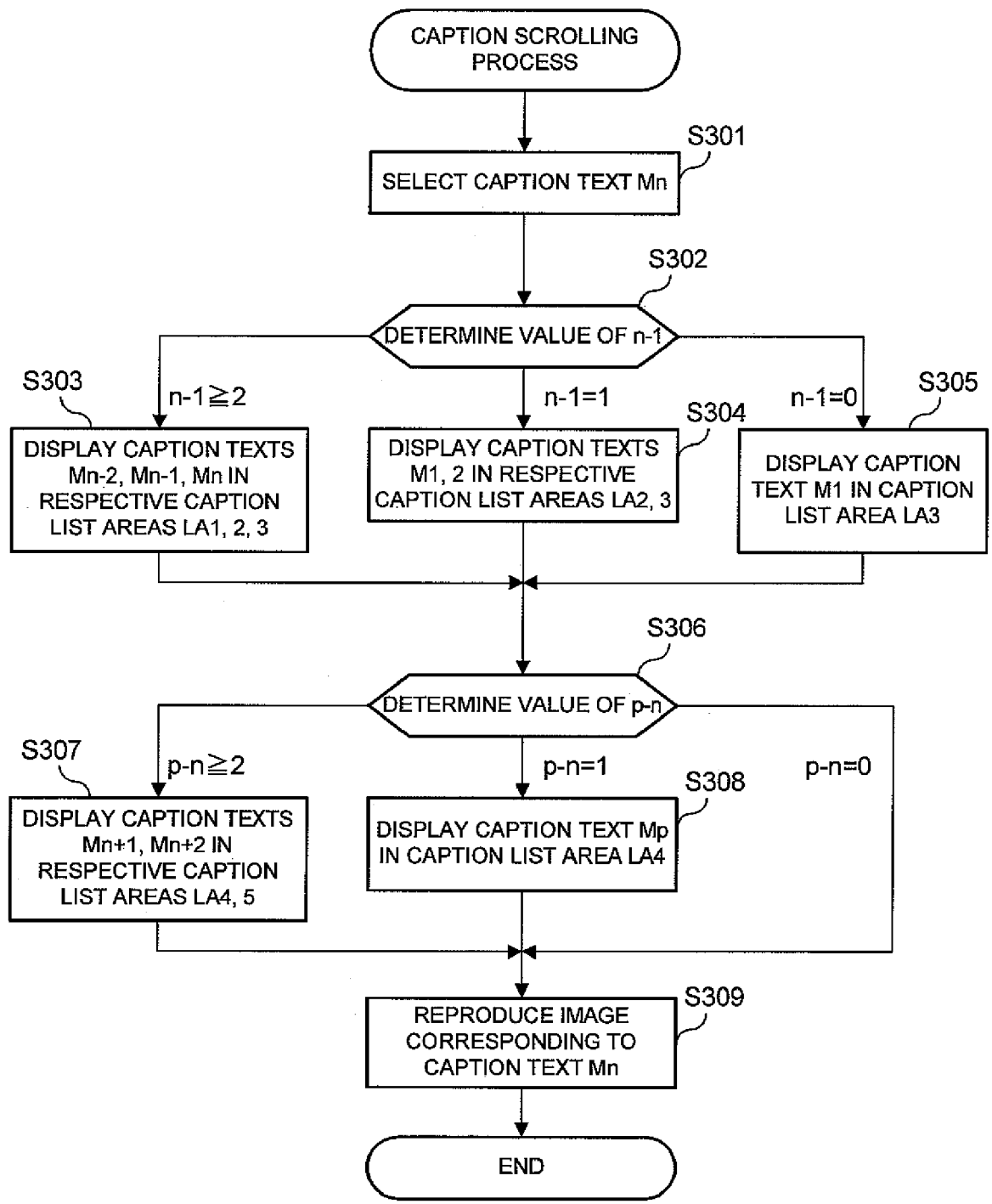
FIG. 11 is a flowchart showing a caption scrolling process executed by the control unit of the cellular phone according to the embodiment.

As an application for reproducing a captioned image is activated and operation information for setting the mode to the caption-list-added viewing mode is supplied from the operation unit 22, the control unit 23 executes a caption scrolling process in accordance with the flowchart of FIG. 11.

First, the control unit 23 selects a caption text Mn as operation information to the effect that the caption text Mn is selected from the operation unit 22 (step S301). The selected caption text Mn is a caption text from the head to the nth (n: natural integer from 1 to p, where p is the number of caption texts contained in the caption management data) caption text registered in the caption management data 182a (or 182b).

The control unit 23 determines the value of n−1 (step S302).

When determining that n−1≧2, the control unit 23 performs control so that caption texts Mn−2, Mn−1, and Mn are displayed in the caption list branch areas LA1, 2, 3, respectively (step S303).

When determining that n−1=1, the control unit 23 performs control so that caption texts M1, M2 are displayed in the caption list branch areas LA2, 3, respectively (step S304).

When determining that n−1=0, the control unit 23 performs control so that a caption text M1 is displayed in the caption list branch area LA3 (step S305). Next, the control unit 23 determines the value of p−n (step S306).

When determining that p−n≧2, the control unit 23 performs control so that caption texts Mn+1, Mn+2 are displayed in the caption list branch areas LA4, 5, respectively (step S307), reproduces an image corresponding to a caption text Mn (step S309), and then terminates the caption scrolling process.

When determining that p−n=1, the control unit 23 performs control so that a caption text Mp is displayed in the caption list branch area LA4 (step S308), reproduces an image corresponding to a caption text Mn (step S309), and then terminates the caption scrolling process.

When determining that p−n=0, the control unit 23 reproduces an image corresponding to the caption text Mn (step S309), and then terminates the caption scrolling process.

The control unit 23 compares a caption display time TMn with a seek point TRi, and starts reproducing an image from an image indicated by an image position PRn right before a caption display time TMn.

According to the caption scrolling process, when the user of the cellular phone 1 operates the cursor key 33 to select a caption text in the caption-list-added viewing mode, the selected caption text is scrolled to the center of the caption list area LA and is displayed, and, images are successively reproduced in accordance with a reproduction order starting from an image corresponding to the selected caption text.

Figure 12:
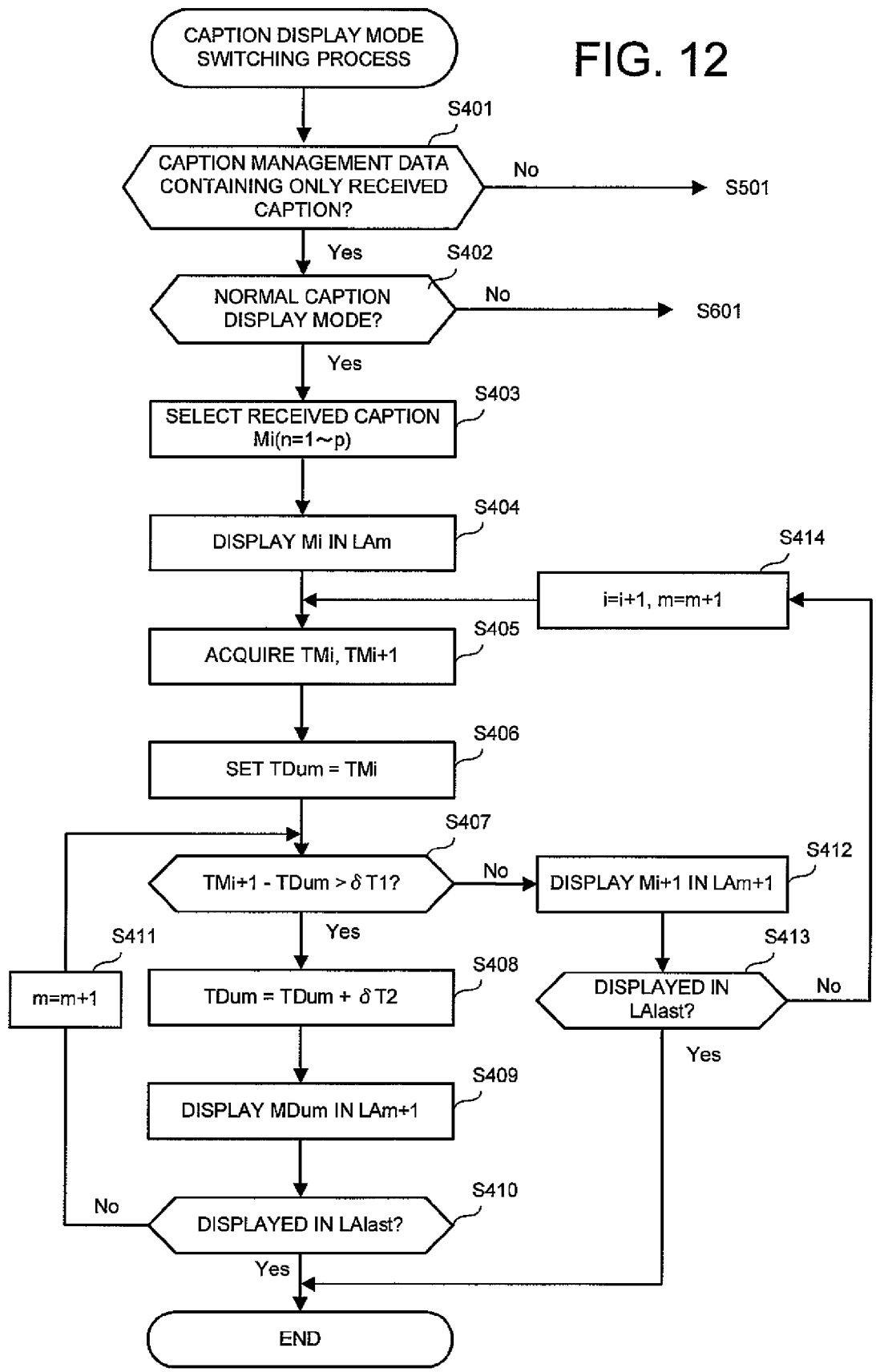
FIGS. 12 to 15 are flowcharts showing a caption display mode switching process executed by the control unit of the cellular phone according to the embodiment.

Next, an explanation will be given of an operation of the cellular phone 1 when a recorded content is reproduced. In particular, an explanation will be given of a caption display mode switching process of switching a mode of displaying only a received caption in the caption list area LA and a mode of displaying a received caption and a dummy caption, in the caption-list-added viewing mode, with reference to the flowchart of FIG. 12.

Hereinafter, a mode of displaying a caption list comprised of only a received caption in the caption list area LA in the caption-list-added viewing mode is called a "normal caption display mode", and a mode of displaying a caption list comprised of a received caption and a dummy caption is called a "dummy caption display mode".

As the power button provided at the keyboard 32 of the cellular phone 1 is pressed, the control unit 23 turns ON the cellular phone 1. As the user operates the keyboard 32 and operation information for setting the mode to the caption-list-added viewing mode and operation information for reproducing the recorded content of a one-segment broadcasting are supplied from the operation unit 22, the control unit 23 starts the caption display mode switching process.

First, the control unit 23 determines whether caption management data stored in the caption management data memory area 182 is caption management data in which only a received caption is registered or caption management data in which a received caption and a dummy caption are registered (step S401).

When determining that it is caption management data in which a received caption and a dummy caption are registered (step S401: NO), the control unit 23 progresses the process to step S501.

When determining that it is caption management data in which only a received caption is registered (step S401: YES), the control unit 23 determines whether or not a set caption display mode is the "normal caption display mode" (step S402).

When determining that it is not the normal caption display mode (step S402: NO), i.e., when the current caption display mode is the dummy caption display mode, the control unit 23 progresses the process to step S601 and executes a process of switching the mode to the normal caption display mode.

When determining that the caption display mode is the normal caption display mode (step S402: YES), the control unit 23 executes a process of switching the mode to the dummy caption display mode.

Regarding the mode of switching the mode to the dummy caption display mode, an explanation will be given of a process of displaying caption texts in the caption list area LA in the ascending order relative to the reproduction order.

As the user operates the keyboard 32 and operation information for selecting a received caption Mi is supplied, the control unit 23 selects a received caption Mi (i=1 to p) (step S403).

As the received caption Mi is selected, the control unit 23 performs control so that the received caption Mi is displayed in a caption list branch area LAm located at the center of the caption list area LA (step S404).

Next, the control unit 23 refers to caption management data, and acquires a received caption display time TMi of the selected received caption Mi and a received caption display time TMi+1 of a received caption Mi+1 corresponding to the next reproduction order (step S405).

The control unit 23 sets the received caption display time TMi acquired in the step S405 to be the initial value of a dummy caption display time TDum (step S406).

Next, the control unit 23 determines which one is larger between a difference (TMi+1−TDum), which is between the initial value of the dummy caption display time TDum and the received caption display time TMi+1, and the reference time δT1 (step S406). When determining that (TMi+1−TDum) is smaller than the reference time δT1 (step S407: NO), the control unit 23 progresses the process to step S412.

When determining that (TMi+1−TDum) is larger than the reference time δT1 (step S407: YES), the control unit 23 sets the dummy caption display time TDum to be (TDum+δT2) (step S408).

Thereafter, the control unit 23 performs control so that a dummy caption MDum is displayed in a caption list branch area LAm+1 following to the caption list branch area LAm (step S409).

Next, the control unit 23 determines whether or not a caption text is displayed in the lowest caption list branch area LAlast in the caption list area LA (step S410).

When determining that a caption text is displayed in the caption list branch area LAlast (step S410: YES), the control unit 23 terminates the caption display mode switching process.

When determining that no caption text is displayed in the caption list branch area LAlast (step S410: NO), the control unit 23 increments a value m indicating the position of a caption list branch area (step S411), and returns the process to the step S407.

When the process returns to the step S407, the control unit 23 again determines which one is larger between (TMi+1−TDum) and δT1 (step S407). Note that the dummy caption display time TDum is a dummy caption display time set in the step S408.

That is, the control unit 23 repeats the process from the step S407 to the step S411 until (TMi+1−TDum) becomes smaller than or equal to the reference time δT1.

When determining that (TMi+1−TDum) is smaller than the reference time δT1 (step S407: NO), the control unit 23 performs control so that a received caption Mi+1 is displayed in a caption list branch area LAm+1 (step S412).

Next, the control unit 23 determines whether or not a caption text is displayed in the lowest caption list branch area LAlast in the caption list branch areas (step S413). When determining that a caption text is displayed in the caption list branch area LAlast (step S413: YES), the control unit 23 terminates the caption display mode switching process.

When determining that no caption text is displayed in the caption list branch area LAlast (step S413: NO), the control unit 23 increments a value i indicating the reproduction order of a received caption and a value m indicating the position of a caption list branch area (step S414). Thereafter, the control unit 23 returns the process to the step S405.

Accordingly, the control unit 23 repeats the process from the step S405 to the step S414 until a caption text is displayed in the caption list branch area LAlast.

Figure 13:
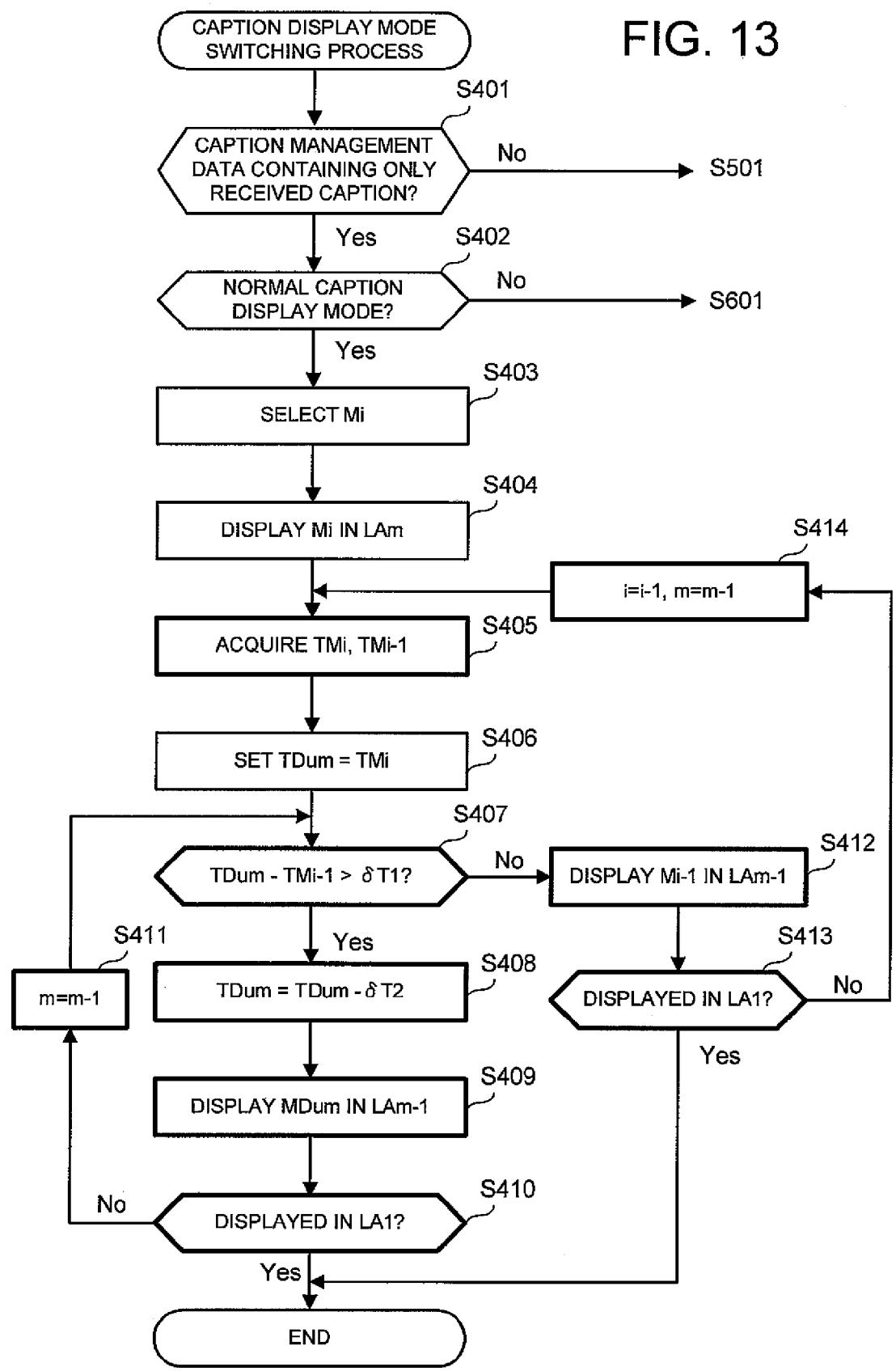

The explanation has been given of the process of displaying a caption text in the caption list area LA in an ascending order relative to the reproduction order, and the same is true of a process of displaying a caption text in the caption list area LA in a descending order relative to the reproduction order. This process is shown in the flowchart of FIG. 13.

The difference from the process of displaying a caption text in the caption list area LA in an ascending order relative to the reproduction order is that the control unit 23 first acquires a received caption display time TMi of a selected received caption Mi and a received caption display time TMi−1 of a received caption Mi−1 corresponding to the reproduction order previous to the received caption Mi in the step S405.

The control unit 23 determines which one is large between (TDum−TMi−1) and 8T1 in the step S407.

The control unit 23 sets a dummy caption display time TDum to be (TDum−δT2) in the step S408.

The control unit 23 displays a dummy caption MDum in a caption list branch area LAm−1 in the step S409, and determines whether or not a caption text is displayed in the top caption list branch area LA1 of the dummy caption area LA in the step S410. The control unit 23 decrements the value m indicating the position of a caption list branch area in the step S411.

The control unit 23 displays a received caption Mi−1 in a caption list branch area LAm−1 in the step S412, and determines whether or not a caption text is displayed in the caption list branch area LA1 in the step S413. The control unit 23 decrements a value i indicating the reproduction order of a received caption and a value m indicating the position of a caption list branch area in the step S414.

According to the foregoing process, in the caption-list-added viewing mode, the mode is switched from the "normal caption display mode" of displaying only a received caption in the caption list area LA to the "dummy caption display mode" of displaying a received caption and a dummy caption.

Figure 14:
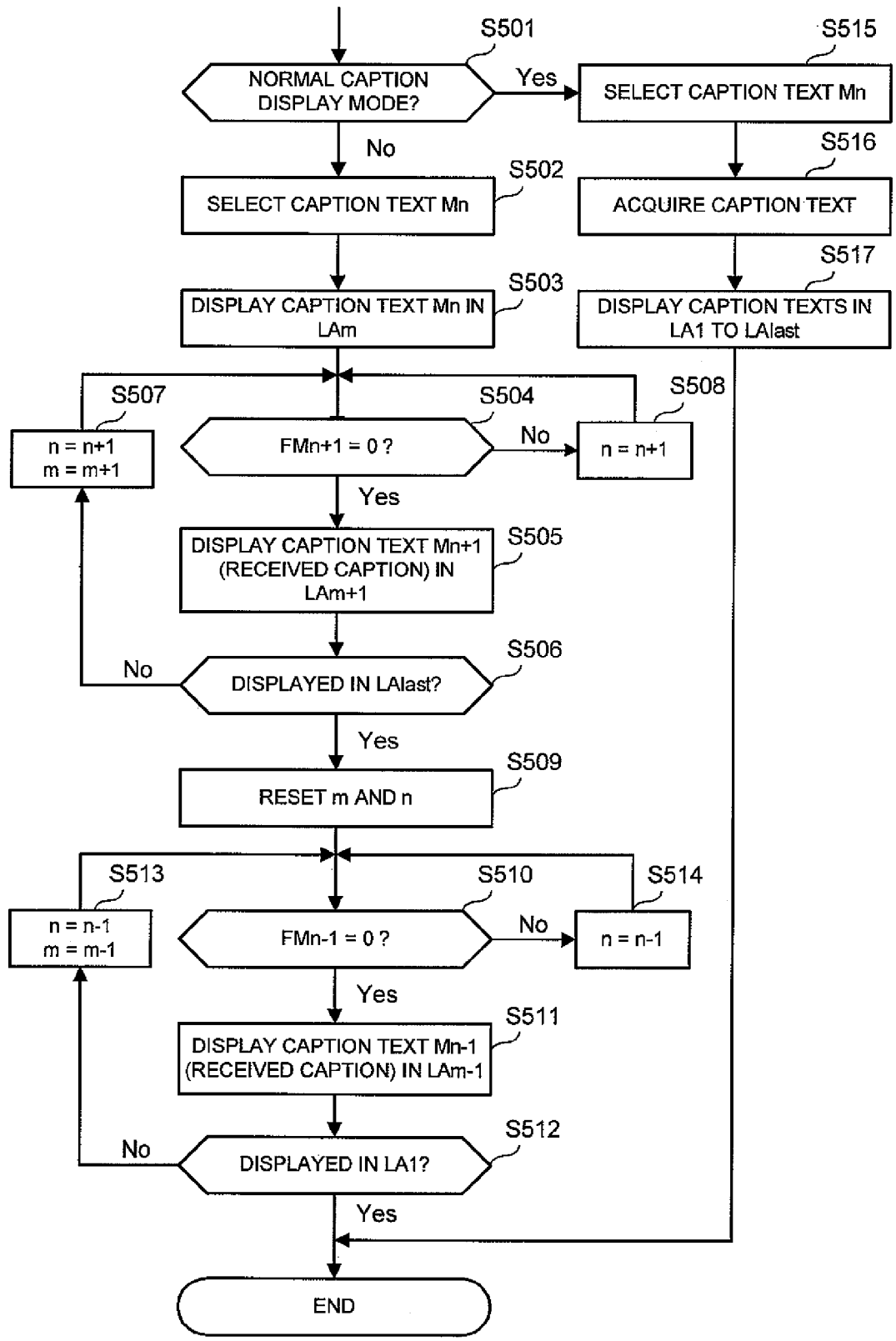

Next, an explanation will be given of a process in a case where the control unit 23 determines that caption management data in which a received caption and a dummy caption are registered is stored (step S401: NO), with reference to the flowchart of FIG. 14.

First, the control unit 23 determines whether or not the current caption display mode is the normal caption display mode (step S501). When determining that the current caption display mode is the normal caption display mode (step S501: YES), the control unit 23 progresses the process to step S515 to switch the current caption display mode to the dummy caption display mode. The process following to the step S515 will be discussed later.

Conversely, when determining that the current caption display mode is not the normal caption display mode (step S501: NO), the control unit 23 progresses the process to step S502 to switch the mode to the normal caption display mode. As operation information to the effect that a caption text Mn is selected is supplied from the operation unit 22, the control unit 23 selects the caption text Mn (step S502).

The control unit 23 displays the selected caption text Mn in a caption list branch area LAm located at the center of the caption list area LA (step S503).

Next, the control unit 23 refers to caption management data, acquires a caption flag FMn+1 of a caption text Mn+1 corresponding to the reproduction order next to the caption text Mn, and determines whether or not the value of FMn+1 is 0 (step S504).

The caption text Mn+1 is a received caption or a dummy caption. When FMn+1=0, the caption text Mn+1 is a received caption, and when FMn+1=1, the caption text Mn+1 is a dummy caption. Note that the value of the caption flag can be set arbitrarily.

When determining that FMn+1=1 (step S504: NO), the control unit 23 increments a value n indicating the reproduction order of a caption text (step S508), and returns the process to the step S504.

Conversely, when determining that FMn+1=0 (step S504: YES), the control unit 23 performs control so that the caption text Mn+1 is displayed in a caption list branch area LAm+1 right below the caption list branch area LAm (step S505).

The control unit 23 determines whether or not a received caption is displayed in the lowest caption list branch area LAlast in the caption list area LA (step S506). When determining that no received caption is displayed in the caption list branch area LAlast (step S506: NO), the control unit 23 increments a value n indicating the reproduction order of a caption text and a value m indicating the position of a caption list branch area (step S507), and returns the process to the step S504.

Therefore, the control unit 23 repeats the process from the step S504 to the step S507 until a received caption is displayed in the lowest caption list branch area LAlast in the caption list area LA.

When determining that a received caption is displayed in the caption list branch area LAlast (step S506: YES), the control unit 23 resets a value n indicating the reproduction order of a caption text and a value m indicating the position of a caption list branch area (step S509).

Next, the control unit 23 refers to caption management data, acquires a caption flag FMn−1 of a caption text Mn−1 corresponding to the reproduction order previous to the caption text Mn, and determines the value of FMn−1 (step S510).

When determining that FMn−1=1 (step S510: NO), the control unit 23 decrements a value n indicating the reproduction order of a caption text (step S514), and returns the process to the step S510.

Conversely, when determining that FMn−1=0 (step S510: YES), the control unit 23 performs control so that the caption text Mn−1 is displayed in a caption list branch area LAm−1 right above the caption list branch area LAm (step S511).

The control unit 23 determines whether or not a received caption is displayed in the top caption list branch area LA1 in the caption list area LA (step S512). When determining that no received caption is displayed in the caption list branch area LA1 (step S512: NO), the control unit 23 decrements a value n indicating the reproduction order of a caption text and a value m indicating the position of a caption list branch area (step S513), and returns the process to the step S510.

Therefore, the control unit 23 repeats the process from the step S510 to the step S513 until a received caption is displayed in the caption list branch area LA1.

When determining that a received caption is displayed in the caption list branch area LA1 (step S512: YES), the control unit 23 terminates the caption display mode switching process.

Next, an explanation will be given of a process in a case where the control unit 23 determines that the current caption display mode is the normal caption display mode (step S501: YES).

As operation information to the effect that a caption text Mn is selected is supplied from the operation unit 22, the control unit 23 selects the caption text Mn (step S515).

Next, the control unit 23 refers to caption management data in which a dummy caption and a received caption are registered, and acquires caption texts around the selected caption text Mn to be displayed in the caption list branch areas LA1 to LAlast (step S516). The acquired caption texts contain a received caption or a dummy caption.

The control unit 23 displays the acquired caption texts in the caption list branch areas LA1 to LAlast (step S517), and terminates the caption display mode switching process.

When the current caption display mode is the dummy caption display mode, the control unit 23 does not determine the value of a caption flag FMn registered in caption management data, but acquires a registered caption text and displays it, thereby displaying a received caption and a dummy caption in the caption list area LA.

Moreover, when the current caption display mode is the normal caption display mode, the control unit 23 determines the value of a caption flag FMn registered in caption management data, thereby displaying only a received caption in the caption list area LA.

Figure 15:
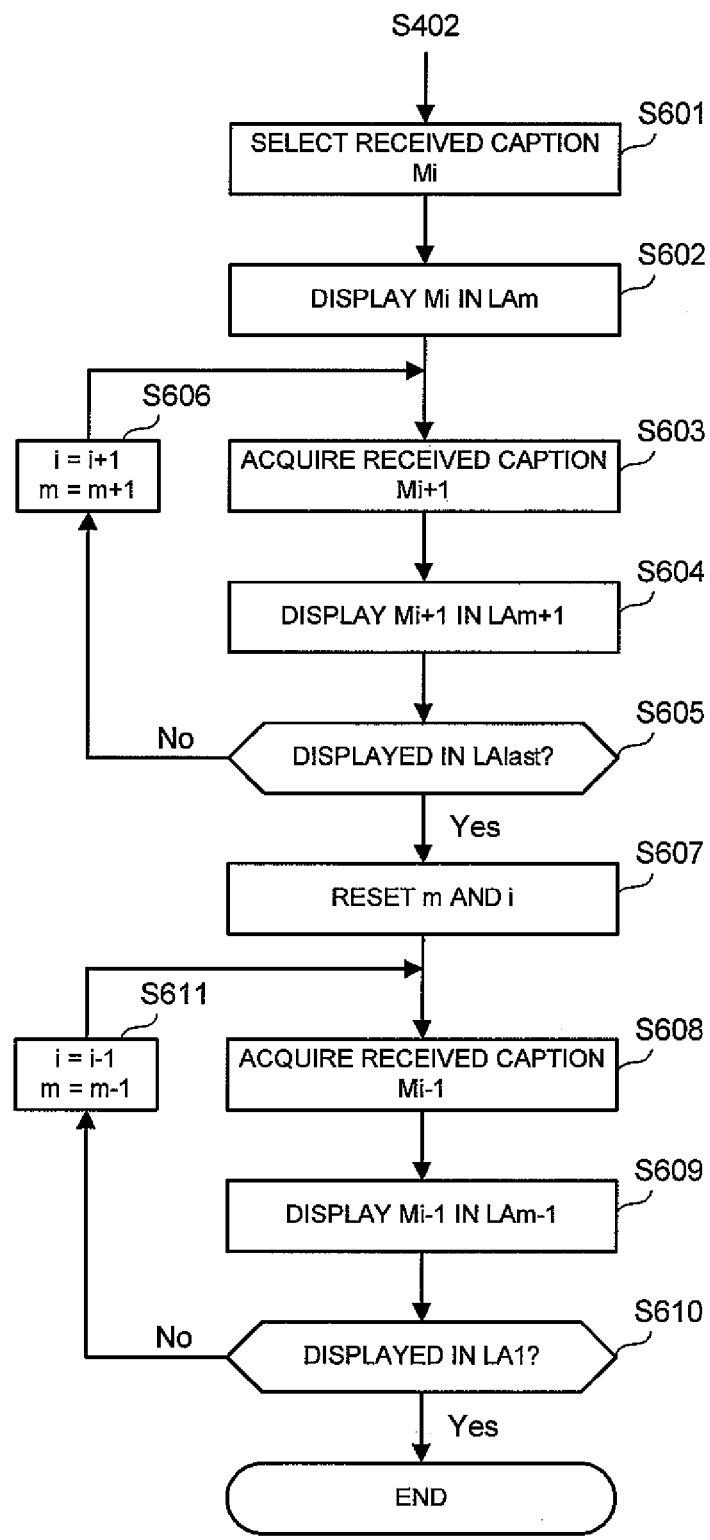

Returning to FIG. 12, an explanation will be given of a process when the control unit 23 determines that caption management data in which only a received caption is registered and determines that the current caption display mode is the dummy caption display mode (step S402: NO), with reference to the flowchart of FIG. 15. In this case, the control unit 23 executes a process of switching the caption display mode from the dummy caption display mode to the normal caption display mode.

First, when operation information to the effect that a received caption Mi is selected is supplied from the operation unit 22, the control unit 23 selects the received caption Mi (step S601), and displays the received caption Mi in the caption list branch area LAm located at the center of the caption list area LA (step S602).

Next, the control unit 23 refers to caption management data in which only a received caption is registered, acquires a received caption Mi+1 corresponding to the reproduction order next to the received caption Mi (step S603), and displays the received caption Mi+1 in a caption list branch area LAm+1 right below the caption list branch area LAm (step S604).

The control unit 23 determines whether or not a received caption is displayed in the lowest caption list branch area LAlast in the caption list area LA (step S605). When determining that no received caption is displayed in the caption list branch area LAlast (step S605: NO), the control unit 23 increments a value i indicating the reproduction order of a received caption and a value m indicating the position of a caption list branch area (step S605), and returns the process to the step S603.

Conversely, when determining that a received caption is displayed in the caption list branch area LAlast (step S605: YES), the control unit 23 progresses the process to step S607.

Therefore, the control unit 23 repeats the process from the step S603 to the step S606 until a received caption is displayed in the caption list branch area LAlast.

As a received caption is displayed in the caption list branch area LAlast, the control unit 23 resets the value i indicating the reproduction order of a received caption and the value m indicating the position of a caption list branch area to the values at the step S602 (step S607).

Next, the control unit 23 refers to caption management data, acquires a received caption Mi−1 corresponding to the reproduction order previous to the received caption Mi (step S608), and displays the received caption Mi−1 in a caption list branch area LAm−1 (step S609).

The control unit 23 determines whether or not a received caption is displayed in the top caption list branch area LA1 in the caption list area LA (step S610).

When determining that no received caption is displayed in the caption list branch area LA1 (step S610: NO), the control unit 23 decrements the value i indicating the reproduction order of a received caption and the value m indicating the position of a caption list branch area (step S611), and returns the process to the step S608.

Conversely, when determining that a received caption is displayed in the caption list branch area LA1 (step S610: YES), the control unit 23 terminates the caption display mode switching process.

Through the caption display mode switching process, it is possible to switch the caption display mode between the normal caption display mode and the dummy caption display mode in the caption-list-added viewing mode. When the mode is switched to the dummy caption display mode, as the user operates the keyboard to select a dummy caption, it is possible to select a scene having no received caption and to view an image corresponding to that scene.

In both cases where a dummy caption is registered in caption management data and where no dummy caption is registered, it is possible to switch the caption display mode between the normal caption display mode and the dummy caption display mode in the caption-list-added viewing mode.

Hereinafter, an explanation will be given of the specific example of the caption display mode switching process in this case with reference to FIGS. 16A to 16C.

First, an explanation will be given of a case where caption management data stored in the memory unit 18 is caption management data 182a shown in FIG. 16A, and the reference time δT1 and the predetermined time δT2 are set to 10 seconds and 5 seconds, respectively.

The control unit 23 starts the caption display mode switching process, and determines that only a received caption is registered in caption management data (step S401: YES) and the mode is set to the normal caption mode (step S402: YES), and, executes the process of switching the mode to the dummy caption display mode. As the user selects a received caption M3 "nice weather, today" (step S403), the control unit 23 performs control so that the received caption M3 is displayed in the caption list branch area LA3 (step S404). The control unit 23 refers to the caption management data 182a, and acquires received caption display times TM3 (00:00:13) and TM4 (00:01:43) of received captions M3 and M4, respectively (step S405).

Next, the control unit 23 sets the initial value of a dummy caption display time TDum to the received caption display time TM3 (step S406), and determines which one is larger between a difference, which is between TM4 and the initial value of TDum, and the reference time δT1 (10 seconds) (step S407).

The difference between TM4 and the initial value of TDum is 90 seconds and is larger than the reference time 10 seconds (step S407: Yes), the control unit 23 sets a time (00:00:18) that the predetermined time δT2 (5 seconds) is added to the dummy caption display time TDum (step S408).

Next, the control unit 23 performs control so that a dummy caption "dummy caption 00:00:18" is displayed in the caption list branch area LA4 right below the caption list branch area LA3 (step S409).

The control unit 23 determines that no caption text is displayed in the lowest caption list branch area LA5 in the caption list area LA (step S410: NO), and updates a value indicating the position of a caption list branch area to 4 (step S411).

The control unit 23 returns the process to the step S407, determines which one is larger between a difference, which is between the received caption display time TM4 (00:01:43) and the dummy caption display time TDum (00:00:18), and the reference time δT1 (10 seconds) (step S407), and since such a difference is 85 seconds, sets a dummy caption display time to (00:00:23) that the predetermined time δT2 (five seconds) is added to the current dummy caption display time TDum.

Next, the control unit 23 performs controls so that a dummy caption "dummy caption 00:00:23" is displayed in the caption list branch area LA5 next to the caption list branch area LA4 (step S409).

Thereafter, the control unit 23 determines that a caption text is displayed in the lowest caption list branch area LA5 of the caption list area LA (step S410: YES), and terminates the process.

The similar process is executed for a case where a reproduction order is a descending order. In the case of the caption management data 182*a* shown in FIG. 16A, a difference between caption list display times TM3 and TM2 is 4 seconds, and a difference between TM2 and TM1 is 9 seconds, so that no dummy caption is displayed in the caption list branch areas LA1 and LA2.

FIGS. 16B and 16C show display examples of the LCD 31 of the display unit 21 when the control unit 23 selects the caption text M3 ("nice weather, today").

In the case of the normal caption display mode, a screen D3 shown in FIG. 16B is displayed on the LCD 31. In the caption list branch areas LA3, LA4, and LA5, received captions M3 ("nice weather, today"), M4 ("good-bye, take care") and M5 ("good night") are respectively displayed.

Conversely, in the case of the dummy caption display mode, a screen D4 shown in FIG. 16C is displayed on the LCD 31. In the caption list branch area LA3, the received caption M3 ("nice weather, today") is displayed, and in the caption list branch areas LA4 and LA5, a dummy caption "dummy caption 00:0018" and a dummy caption "dummy caption 00:00:23" are respectively displayed.

Although a dummy caption is represented in the form of "dummy caption (dummy caption display time)" in the embodiment, the display form is not limited to the foregoing one, and can be any forms which can be recognized by the user as a dummy caption.

The reference time δT1 and the predetermined time δT2 are not limited to the foregoing values, and for example, the user can set an arbitrarily value via a menu screen.

Moreover, when the memory unit 18 stores caption management data 182*b* shown in FIG. 10 and the mode is switched from the normal caption display mode to the dummy caption display mode, a screen displayed on the LCD 31 is also switched from the screen D3 shown in FIG. 16B to the screen D4 shown in FIG. 16C.

In the dummy caption display mode, for example, when a dummy caption is displayed in a commercial scene and the user wants to view an image corresponding to a received caption after the commercial scene, it is necessary for the user to switch the caption display mode to the normal caption display mode so that no dummy caption will be displayed.

If a dummy caption can be skipped to scroll a caption without switching the display mode, it is possible for the user to easily view an image corresponding to a next received caption, resulting in the improvement of the usability for the user.

Figure 17:
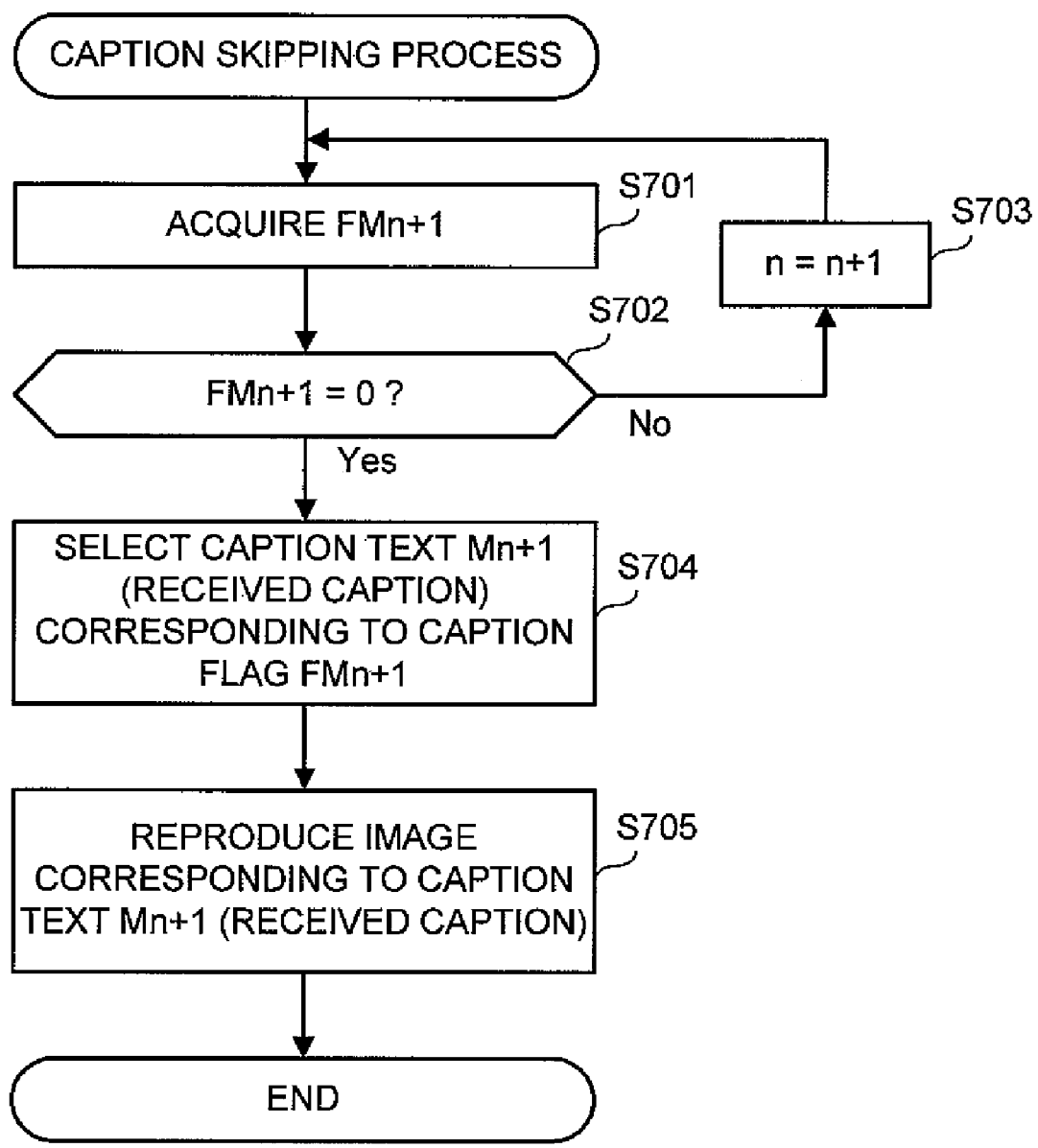
FIGS. 17 and 18 are flowcharts showing a caption skipping process executed by the control unit of the cellular phone according to the embodiment.

An explanation will be given of a caption skipping process of selecting a next received caption while skipping a dummy caption in the dummy caption display mode and of reproducing an image corresponding to the next received caption, with reference to the flowchart of FIG. 17.

Let us suppose that the memory unit 18 stores caption management data, in which a dummy caption and a received caption are registered, beforehand.

As the user operates the keyboard 32 with the power of the cellular phone 1 being ON, and operation information for activating an application which reproduces the recorded content of a one-segment broadcasting and for setting to a dummy caption display mode and further, operation information for executing the caption skipping process are supplied from the operation unit 22, the control unit 23 starts executing the caption skipping process. For example, when a jump key provided at the keyboard 32 is operated, the operation unit 22 supplies operation information for executing the caption skipping process to the control unit 23.

In the following explanation, an explanation will be given of the case where the caption skipping process is performed on the recorded contents in the forward direction.

As the control unit 23 receives an instruction for the caption skipping process, the control unit 23 reads out caption management data stored in the memory unit 18, and acquires a caption flag FMn+1 added to a caption text Mn+1 corresponding to the reproduction order next to a caption text Mn which is being reproduced (step S701).

Next, the control unit 23 determines whether or not the value of the acquired caption flag FMn+1 is 0 (step S702). Let us suppose that when the value of the caption flag is 0, a caption text corresponding to the caption flag is a received caption, and when the value of the caption flag is 1, a caption text corresponding to the caption flag is a dummy caption. Setting of the value of the caption flag is not limited to this case, and other values can be used.

When determining that FMn+1=1 (step S702: NO), the control unit 23 increments a value n indicating the reproduction order of a caption text (step S703), and returns the process to the step S701. Accordingly, the control unit 23 repeats the process from the step S701 to the step S703 until the control unit 23 determines that FMn+1=0.

Conversely, when determining that FMn+1=0 (step S702: YES), the control unit 23 selects a caption text Mn+1, i.e., a received caption corresponding to the caption flag FMn+1 (step S704).

Thereafter, the control unit 23 reproduces an image corresponding to the selected caption text Mn+1 (received caption) on the LCD 31 of the display unit 21 (step S705), and terminates the caption skipping process.

According to the caption skipping process, in the dummy caption display mode, for example, as the user presses the jump key provided at the keyboard 32, a dummy caption is skipped and the user can view an image beginning from an image corresponding to a next received caption. This improves the usability.

Figure 18:
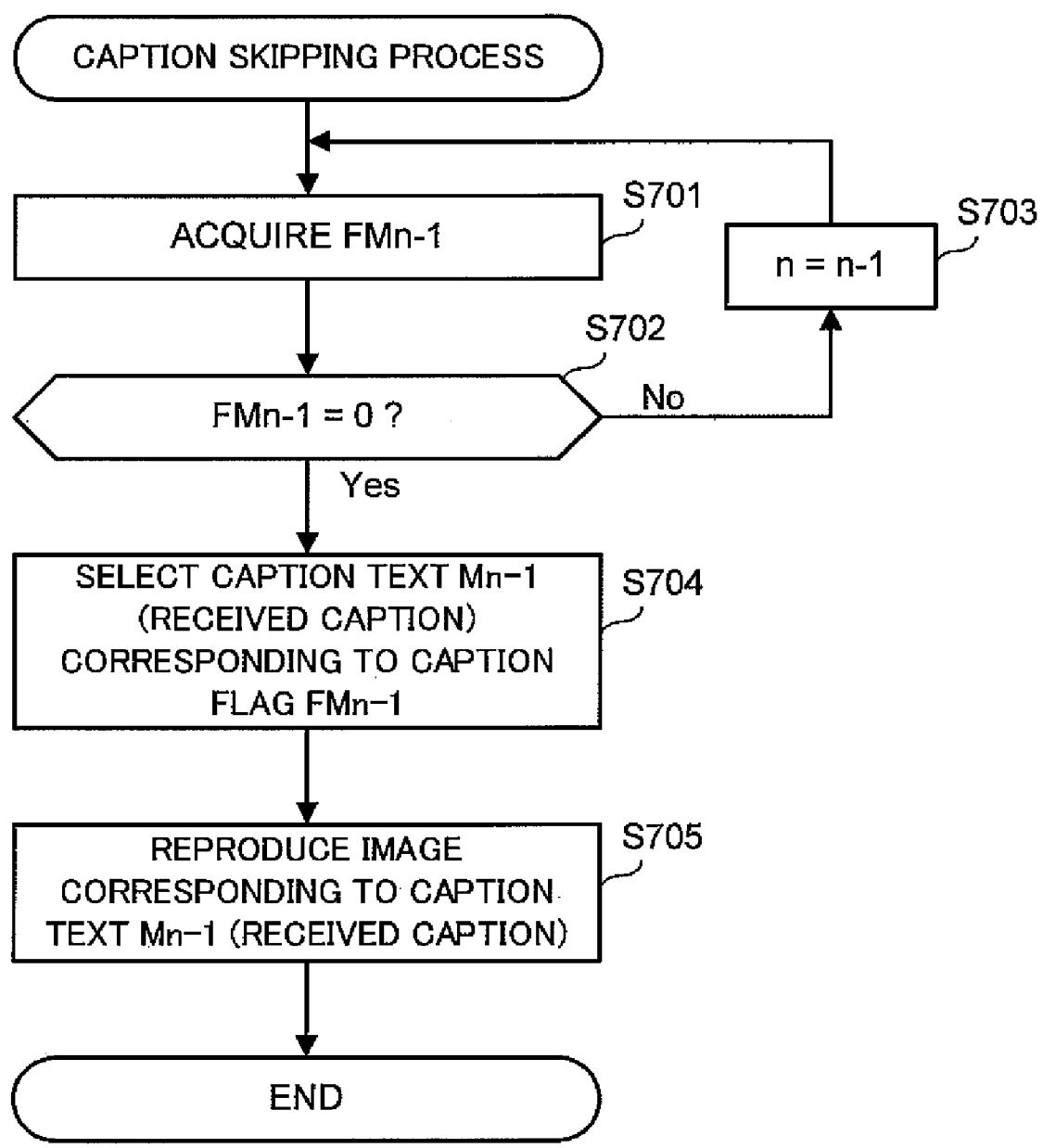

In the foregoing explanation, the explanation has been given of the case where the caption skipping process is performed on the recorded contents in the forward direction, but the caption skipping process can be executed in the backward direction in accordance with the flowchart of FIG. 18.

Figure 19A:
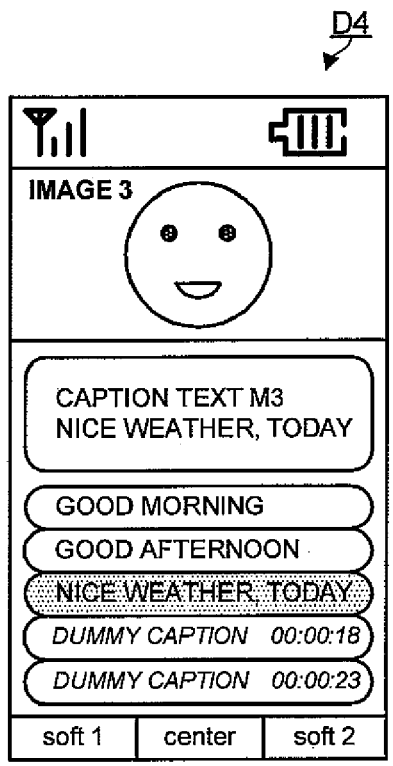
FIG. 19A is a diagram showing an example of a screen prior to the caption skipping process.
Figure 19B:
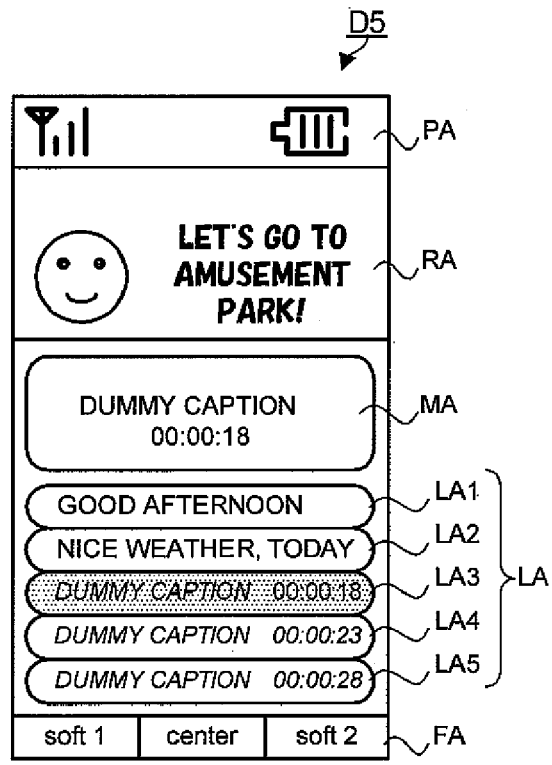
FIG. 19B is a diagram showing an example of a screen when the caption skipping process is not executed and a dummy caption is selected.
Figure 19C:
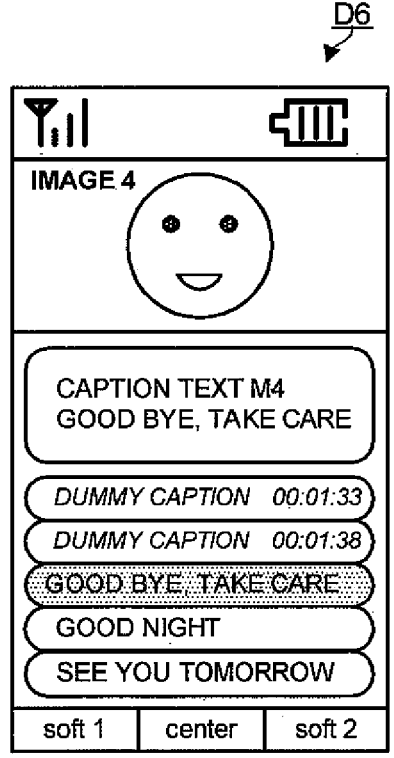
FIG. 19C is a diagram showing an example of a screen after the caption skipping process.

FIGS. 19A to 19C show a display example of a screen displayed on the LCD 31 of the display unit 21 when this caption skipping process is executed. First, as shown in FIG. 19A, in a screen D4 prior to executing the caption skipping process, a received caption "nice weather, today" is selected and an image corresponding to that caption is displayed in the image area RA. Reproduction of an image is shifted to the next reproduction order, and a dummy caption "dummy caption 00:0018" is selected and a screen D5 shown in FIG. 19B is displayed.

As the user presses the jump key of the keyboard 32 to execute the caption skipping process, a next received caption "good-bye, take care" is selected and a screen D6 shown in FIG. 19C is displayed.

As explained above, by executing the caption skipping process, when the user wants to a scene corresponding to a next received caption, for example, while a commercial is being reproduced in the dummy caption display mode, as the user operates the jump key of the keyboard 32, it is possible for the user to quickly view a scene corresponding to the next received caption.

In the foregoing embodiment, when the user instructs to skip a caption, caption skipping is instructed as the user presses the jump key provided at the keyboard 32, but the present invention is not limited to this case, and for example, as the user presses the cursor key 33 for a while, caption skipping may be instructed.

Meanwhile, in the foregoing embodiment, it is not possible for the user to determine a current caption display mode unless the user checks whether or not a dummy caption is displayed in the caption list area LA.

Figure 20A:
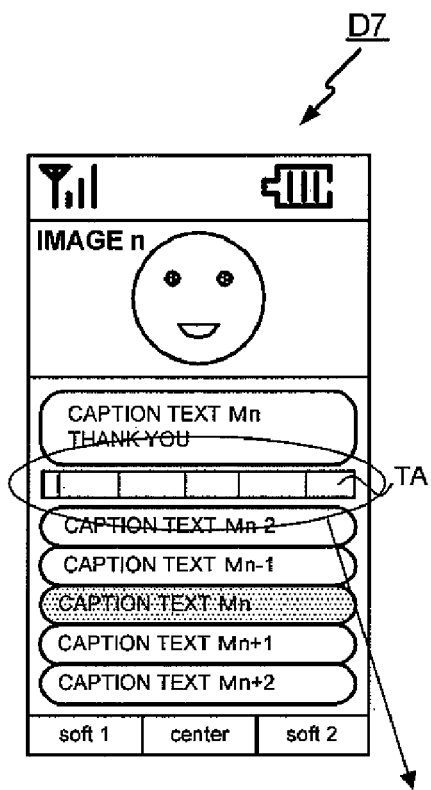
FIG. 20A is a diagram showing an example of a screen displayed by the display unit on the LCD and provided with a time bar area.
Figure 20B:
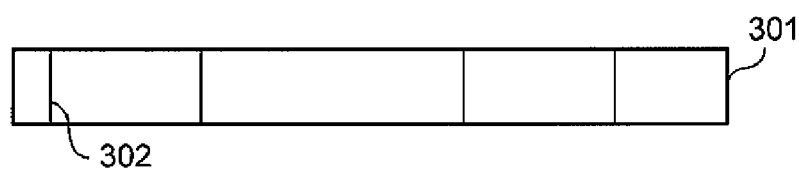
FIG. 20B is a diagram showing an example of an image displayed in the time bar area in the normal caption display mode.
Figure 20C:
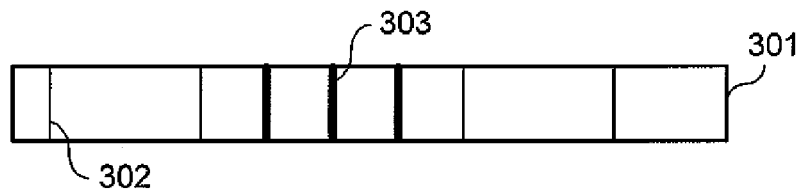
FIG. 20C is a diagram showing an example of an image displayed in the time bar area in the dummy caption display mode.

Accordingly, for example, as shown in FIG. 20A, a screen D7 in which a time bar area is provided between the caption area MA and the caption list area LA is displayed. A time bar 301 as shown in FIGS. 20B and 20C is displayed in the time bar area TA. The time bar 301 indicates the total reproduction time of a content which is being reproduced.

In the normal caption display mode, as shown in FIG. 20B, a line 302 is displayed at a position corresponding to the caption display time of each received caption.

In the dummy caption display mode, as shown in FIG. 20C, a line 303 having a thickness different from the line 302 is displayed at a position corresponding to the dummy caption display time of a dummy caption.

By displaying such a time bar, it is possible for the user of the cellular phone 1 to determine whether or not the caption display mode is the dummy caption display mode by checking the kind of the thickness of a line displayed on the time bar 301 even in the normal view mode.

Whether or not a dummy caption is displayed is indicated by differing the thickness of the line 303 from the line 302, but the present invention is not limited to this case, and any displaying which allows the user to recognize that a received caption display time and a dummy caption display time differ from each other can be acceptable. For example, the line 303 may have a color different from the line 302. Moreover, a predetermined graphic symbol from the one at the position of the line 302 like a square may be displayed at the position of the line 302, and a different graphic symbol may be displayed at the position of the line 303.

The total reproduction time of a content is indicated by the time bar, but the present invention is not limited to this case, and for example, can be indicated by a line.

In the foregoing embodiment, the captioned image reproducing device is the cellular phone 1. But the captioned image reproducing device is not limited to this, and can be, for example, a PHS, a PDA (Personal Digital Assistant), an electronic camera, an electronic wrist watch, a laptop computer, a portable TV, a portable image recording/reproducing device, and a car navigation device.

In the foregoing embodiment, the programs are stored in the memory or the like beforehand. However, the captioned image reproducing device may be operated as a whole device or a part of the whole device, or a program for executing the foregoing process may be stored in a computer-readable recording medium, such as a flexible disk, a CD-ROM (Compact Disk Read-Only Memory), a DVD (Digital Versatile Disk), or an MO (Magneto Optical disk), and distributed, and installed in another computer to cause the computer to operate as the foregoing unit, or to execute steps of the foregoing process.

Furthermore, a program may be stored in the disk device or the like of a server device over the Internet, and may be superimposed on a carrier wave to allow a computer to download the program.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-164232 filed on Jun. 24, 2008 and including specification, claims, drawings and summary. The disclosure of the above Japanese Patent Application is incorporated herein by reference in its entirety.

What is claimed is:

1. A captioned image reproducing device comprising:
   a memory unit that stores plural caption texts, plural images, and plural pieces of reproduction start information each indicating a timing of starting reproduction of each caption text in the plural caption texts;
   a caption list creating unit that refers to the memory unit and creates a caption list including therein a predetermined number of caption texts in accordance with a reproduction order;
   a caption text selecting unit that selects any one of the caption texts included in the caption list;
   a reproducing unit that reproduces a first caption text selected by the caption text selecting unit and at least one of the plural images corresponding to the reproduction start information of the first caption text;
   a determination unit that refers to the memory unit, acquires the reproduction start information of the first caption text and reproduction start information of a second caption text different from the first caption text, and compares a difference between the reproduction start information of the first caption text and the reproduction start information of the second caption text with predetermined reference information;
   a setting unit that sets new reproduction start information between a reproduction order of the first caption text and a reproduction order of the second caption text based on a determination result by the determination unit; and
   a control unit that controls the memory unit to store the new reproduction start information in association with a predetermined dummy caption, at least one of the plural images, and dummy caption reproduction start information indicating a timing of starting reproduction of the dummy caption.

2. The captioned image reproducing device according to claim 1, wherein:
   the second caption text is a caption text corresponding to a reproduction order right before or right after the first caption text; and
   when the determination unit determines that the difference between the two pieces of reproduction start information is larger than the reference information, the setting unit sets the new reproduction start information between the reproduction order of the first caption text and the reproduction order of the second caption text.

3. The captioned image reproducing device according to claim 2, wherein the dummy caption reproduction start information is information acquired by subtracting a predetermined value from the reproduction start information of the first caption text when the second caption text is a caption text corresponding to the reproduction order right before the first caption text, and is information acquired by adding a predetermined value to the reproduction start information of the first caption text when the second caption text is a caption text corresponding to the reproduction order right after the first caption text.

4. The captioned image reproducing device according to claim 1, wherein the dummy caption contains the dummy caption reproduction start information.

5. The captioned image reproducing device according to claim 1, wherein:
the caption text contains a received caption contained in broadcasting data transmitted from an external device and the dummy caption;
the captioned image reproducing device further comprises a caption list display unit that displays the caption list; and
the caption list creating unit creates a caption list containing the received caption and the dummy caption associated with the new reproduction start information by the control unit.

6. The captioned image reproducing device according to claim 1, wherein:
the caption text contains a received caption contained in broadcasting data transmitted from an external device and the dummy caption;
the captioned image reproducing device further comprises a caption list display unit that displays the caption list and a switching unit that switches a mode between a first mode that the caption list includes therein only the received caption and a second mode that the caption list includes therein the received caption and the dummy caption;
the control unit adds an identifier indicating that a caption text is the received caption or the dummy caption to a caption text stored in the memory unit; and
when the switching unit switches the mode, the caption list creating unit determines the identifier added to the caption text, and creates a caption list based on a determination result.

7. The captioned image reproducing device according to claim 6, wherein when the switching unit switches the mode to the first mode, the caption list creating unit determines a caption text to which an identifier that the caption text is the received caption is added, and creates a caption list that includes therein a predetermined number of caption texts in accordance with the reproduction order.

8. The captioned image reproducing device according to claim 6, wherein when the switching unit switches the mode to the second mode, the caption list creating unit determines a caption text to which an identifier that the caption text is the received caption or the dummy caption is added, and creates a caption list which includes therein a predetermined number of caption texts in accordance with the reproduction order.

9. The captioned image reproducing device according to claim 6, wherein the caption text selecting unit successively determines the identifiers in an ascending order or a descending order in accordance with the reproduction order, and selects a caption text to which the identifier is added when determining that the identifier indicates that the caption text is the received caption.

10. The captioned image reproducing device according to claim 6, further comprising:
an image creating unit that creates a picture image indicating the length of a total reproduction time of a content stored in the memory unit;
an image synthesizing unit that synthesizes a predetermined first image with the picture image at a position corresponding to the reproduction start information of the caption text to which an identifier indicating that the caption text is the received caption is added, and synthesizes a predetermined second image with the picture image at a position corresponding to the reproduction start information of the caption text to which an identifier indicating that the caption text is the dummy caption is added; and
a display unit that displays a synthesized image synthesized by the image synthesizing unit.

11. The captioned image reproducing device according to claim 10, wherein the picture image is a bar or a line.

12. The captioned image reproducing device according to claim 10, wherein:
the first image has a predetermined color; and
the second image has a color different from the predetermined color.

13. The captioned image reproducing device according to claim 10, wherein:
the first image is a line having a predetermined thickness; and
the second image is a line having a thickness different from the predetermined thickness.

14. The captioned image reproducing device according to claim 10, wherein:
the first image is a circle having a predetermined diameter; and
the second image is a circle having a diameter different from the predetermined diameter.

15. A captioned image reproducing method comprising:
a memory step of storing plural caption texts, plural images and plural pieces of reproduction start information each indicating a timing of starting reproduction of each caption text in the plural caption texts in a memory unit;
a caption list creating step of referring to the memory unit and of creating a caption list including therein a predetermined number of caption texts in accordance with a reproduction order;
a caption text selecting step of selecting any one of the caption texts included in the caption list;
a reproduction step of reproducing a first caption text selected through the caption text selecting step and at least one of the plural images corresponding to the reproduction start information of the first caption text;
a determination step of referring to the memory unit, of acquiring the reproduction start information of the first caption text and the reproduction start information of a second caption text different from the first caption text, and of comparing a difference between the reproduction start information of the first caption text and the reproduction start information of the second caption text with predetermined reference information;
a setting step of setting new reproduction start information between a reproduction order of the first caption text and a reproduction order of the second caption text based on the determination result of the determination step; and a control step of controlling the memory unit to store the new reproduction start information in association with a predetermined dummy caption, at least one of the plural images, and dummy caption reproduction start information indicating a timing of starting reproduction of the dummy caption.

16. A program embodied on a non-transitory computer readable medium that allows a computer to function as: a memory unit that stores plural caption texts, plural images, and plural pieces of reproduction start information each indicating a timing of starting reproduction of each caption text in the plural caption texts; a caption list creating unit that refers to the memory unit and creates a caption list including therein a predetermined number of caption texts in accordance with a reproduction order; a caption text selecting unit that selects any one of the caption texts included in the caption list; a reproducing unit that reproduces a first caption text selected by the caption text selecting unit and at least one of the plural images corresponding to the reproduction start information of the first caption text; a determination unit that refers to the memory unit, acquires the reproduction start information of the first caption text and the reproduction start information of a second caption text different from the first caption text, and compares a difference between the reproduction start information of the first caption text and the reproduction start information of the second caption text with predetermined reference information; a setting unit that sets new reproduction start information between a reproduction order of the first caption text and a reproduction order of the second caption text based on a determination result by the determination unit; and a control unit that controls the memory unit to store the new reproduction start information in association with a predetermined dummy caption, at least one of the plural images, and dummy caption reproduction start information indicating a timing of starting reproduction of the dummy caption.

* * * * *